(12) United States Patent
Kobayashi et al.

(10) Patent No.: US 10,198,375 B2
(45) Date of Patent: Feb. 5, 2019

(54) SYNCHRONIZATION PROCESSING UNIT, DEVICE, AND SYSTEM

(71) Applicant: NEC Corporation, Tokyo (JP)

(72) Inventors: Yuusuke Kobayashi, Tokyo (JP); Yohei Yamada, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/472,744

(22) Filed: Mar. 29, 2017

(65) Prior Publication Data

US 2017/0286331 A1    Oct. 5, 2017

(30) Foreign Application Priority Data

Mar. 31, 2016   (JP) .................. 2016-070145

(51) Int. Cl.
*G06F 13/16* (2006.01)
*G06F 13/40* (2006.01)

(52) U.S. Cl.
CPC ...... *G06F 13/1689* (2013.01); *G06F 13/4068* (2013.01)

(58) Field of Classification Search
None
See application file for complete search history.

(56) References Cited

U.S. PATENT DOCUMENTS 9,348,740 B2    5/2016   Suzuki et al.

FOREIGN PATENT DOCUMENTS

| JP | 2013-546035 | 12/2013 |
|----|-------------|---------|
| JP | 2014-182795 | 9/2014 |
| JP | 2015-170313 | 9/2015 |
| WO | WO 2011/155027 | 12/2011 |

OTHER PUBLICATIONS

Japanese Decision to Grant a Patent dated Apr. 18, 2017 in corresponding Japanese Patent Application No. 2016-070145 with English translation of Japanese Decision to Grant a Patent.

*Primary Examiner* — Farley Abad
*Assistant Examiner* — Dayton Lewis-Taylor
(74) *Attorney, Agent, or Firm* — Young & Thompson

(57) ABSTRACT

Disclosed are a synchronization processing unit etc. including a command determination unit that determines whether the memory access command is a command for synchronization processing; a completion determination unit that determines whether a memory access command is complete; an issuance unit configured to issue a memory access command determined not to be for the synchronization processing to the memory, and that suspends issuance of a memory access command determined to be for the synchronization processing until completion of a preceding memory access command received before the memory access command for the synchronization processing is determined and then issues the suspended memory access command; and a subsequent control unit that, during a period from the suspension of the memory access command to the issuance and then completion thereof, performs control so that a subsequent memory access command is not received from the external device and the processor in the device.

9 Claims, 15 Drawing Sheets

SYNCHRONIZATION PROCESSING UNIT, DEVICE, AND SYSTEM

This application is based upon and claims the benefit of priority from Japanese Patent Application No. 2016-070145, filed on Mar. 31, 2016, the disclosure of which is incorporated herein in its entirety by reference.

TECHNICAL FIELD

The present invention relates to a technique for performing synchronization processing between a plurality of processors connected by an extension bus.

BACKGROUND ART

Recent years have seen many more systems connecting a processor as an extension-side device on an extension bus as typified by PCIe (Peripheral Component Interconnect Express) or the like. In such a case, a synchronization processing mechanism is often required between a host-side processor and an extension-side processor or between a plurality of extension-side processors. Thus, in general, a method of performing synchronization processing by using host-side memory is known. For example, in PCIe, synchronization processing is performed by using memory in a root complex that is an element serving as a hierarchical root of a PCIe connection. Atomic operation defined by PCIe, flush operation to host-side memory by using a traffic class, and the like are mechanisms suitable to perform synchronization processing by using host-side memory.

One example of techniques relating to such synchronization processing between a plurality of processors is disclosed in Japanese Unexamined Patent Application Publication No. 2014-182795. The related technique disclosed in the patent literature performs synchronization processing between a plurality of logic processors in a processor by using shared memory.

In addition, another example of the techniques relating to synchronization processing between a plurality of processors is disclosed in Japanese Translation of PCT International Application Publication No. 2013-546035. The related technique disclosed in the patent literature performs synchronization processing between a host device and a graphics processing unit by using shared memory.

SUMMARY

However, in performing synchronization processing between a plurality of processors connected by an extension bus, the general method and the related techniques described above have the following issues.

In order to describe the issues, for example, assume that a release-consistency model is implemented as synchronization processing. Release-consistency models have a relatively small overhead among kinds of synchronization processing and are used in many computation systems.

The release-consistency model is composed of two kinds of processes: a release process for delivery processing and an acquire process for takeover processing. In the release process, after data to be delivered is written into memory, a flag for notifying the delivery of the data is written into the memory. In the acquire process, polling of the data delivery flag is performed, and the delivered data is read from the memory when the flag is established.

Here, consider that processing is delivered from a host-side processor to an extension-side processor. In this case, the host-side processor executes the release process, and the extension-side processor executes the acquire process. At this time, due to polling processing in the acquire process by the extension side, a performance issue occurs. Specifically, since the acquire process by the extension side is a polling process, a memory read will be issued to host-side memory at regular intervals. The memory read needs to reciprocate through an extension bus that connects the extension side and the host side, and therefore, a large amount of turn-around time is taken. Additionally, the polling process is repeated until the flag on the host-side memory is established. Due to this, there is an issue in that the acquire process by the extension side repeatedly influences other transactions on the extension bus.

Thus, synchronization processing can be performed by using extension-side memory. In this case, the acquire process on the extension side may perform processing of polling the extension-side memory. Accordingly, there is no above-mentioned performance issue due to repetitive reciprocation of polling processing through the extension bus. However, with only the specification of an extension bus such as PCIe, an issue occurs in terms of the order of read and write transactions on the extension side.

The issue will be described in a case using the above-mentioned release-consistency model in which processing is delivered from the host-side processor to the extension-side processor. In this case, the release process by the host side issues a memory write for writing data to be delivered to the extension-side memory, and then issues a memory write for writing a flag for notifying the delivery of the data. For synchronization processing, the order in which the memory writes are reflected in the extension-side memory is needed to be the same as the order of issuance thereof.

However, it is difficult to ensure the order with only the ordering specifications of the extension bus. This is because a memory network and the like in the extension-side device may be considered not to comply with the specification of the extension bus. For example, in general, when addresses to be accessed are not the same, an ordering relationship between memory accesses is not ensured due to improvement in performance.

This issue will be schematically described with reference to FIG. 15. In FIG. 15, the order of issuance of memory accesses is ensured by the specification of the extension bus until the memory accesses reach an extension bus interface of an extension-side device from a host-side extension bus interface. However, the order of the memory accesses can change in a route from the extension bus interface to memory in the extension-side device. Accordingly, as in FIG. 15, these memory accesses may be reflected in the extension-side memory in an order different from the order of the memory accesses output from the host-side extension bus interface.

Thus, when performing synchronization processing by using the extension-side memory, an issue occurs in that the order of the memory accesses to the memory on the extension side from the host side is not ensured.

In addition, assume that either one of the related techniques disclosed in the patent literature is applied to synchronization processing between processors connected by an extension bus. If an external memory of an extension-side device is applied as the shared memory in the related technique, there occurs a performance deterioration issue due to polling processing on the extension side, as described above. On the other hand, applying the extension-side memory as the shared memory of the related technique causes the issue that the order of memory accesses to the extension-side memory is not ensured, as described above.

The present invention has been accomplished to solve the above-described issues. Specifically, it is an example object of the present invention to provide a technique that, when performing synchronization processing between a plurality of processors connected by an extension bus, ensures the order of memory accesses to memory for use in the synchronization processing without deteriorating performance.

A synchronization processing unit according to one aspect of the present invention includes:

a command determination unit configured to, upon receipt of a memory access command for accessing memory in a device including the synchronization processing unit from an external device connected to the device by an extension bus or from a processor in the device, determine whether or not the memory access command is a command for synchronization processing for instructing synchronization processing;

a completion determination unit configured to determine whether a memory access command issued to the memory is complete or not;

an issuance unit configured to issue a memory access command determined not to be for the synchronization processing to the memory, and that suspends issuance of a memory access command determined to be for the synchronization processing until completion of a preceding memory access command received before the memory access command for the synchronization processing is determined by the completion determination unit and then issues the suspended memory access command; and a subsequent control unit configured to, during a period from the suspension of the memory access command for the synchronization processing to the issuance and then completion thereof, perform control so that a subsequent memory access command is not received from the external device and the processor in the device.

A device according to one aspect of the present invention includes:

a synchronization processing unit including:
 a command determination unit configured to, upon receipt of a memory access command for accessing memory in a device including the synchronization processing unit from an external device connected to the device by an extension bus or from a processor in the device, determine whether or not the memory access command is a command for synchronization processing for instructing synchronization processing;
 a completion determination unit configured to determine whether a memory access command issued to the memory is complete or not;
 an issuance unit configured to issue a memory access command determined not to be for the synchronization processing to the memory, and that suspends issuance of a memory access command determined to be for the synchronization processing until completion of a preceding memory access command received before the memory access command for the synchronization processing is determined by the completion determination unit and then issues the suspended memory access command; and
 a subsequent control unit configured to, during a period from the suspension of the memory access command for the synchronization processing to the issuance and then completion thereof, perform control so that a subsequent memory access command is not received from the external device and the processor in the device; and the memory; and the processor.

A system according to one aspect of the present invention includes:

a device including:
 a synchronization processing unit including:
  a command determination unit configured to, upon receipt of a memory access command for accessing memory in a device including the synchronization processing unit from an external device connected to the device by an extension bus or from a processor in the device, determine whether or not the memory access command is a command for synchronization processing for instructing synchronization processing;
  a completion determination unit configured to determine whether a memory access command issued to the memory is complete or not;
  an issuance unit configured to issues a memory access command determined not to be for the synchronization processing to the memory, and that suspends issuance of a memory access command determined to be for the synchronization processing until completion of a preceding memory access command received before the memory access command for the synchronization processing is determined by the completion determination unit and then issues the suspended memory access command; and
  a subsequent control unit configured to, during a period from the suspension of the memory access command for the synchronization processing to the issuance and then completion thereof, perform control so that a subsequent memory access command is not received from the external device and the processor in the device;
 the memory; and
 the processor; and a host device as the external device.

A method according to one aspect of the present invention includes:

when a synchronization processing unit receives a memory access command for accessing memory in a device including the synchronization processing unit from an external device connected to the device by an extension bus or from a processor in the device, determining whether or not the memory access command is a command for synchronization processing for instructing synchronization processing;

issuing a memory access command determined not to be for the synchronization processing to the memory;

suspending issuance of a memory access command determined to be for the synchronization processing until completion of a preceding memory access command received before the memory access command for the synchronization processing is determined and then issuing the suspended memory access command; and during a period from the suspension of the memory access command for the synchronization processing to the issuance and then completion thereof, performing control so that a subsequent memory access command is not received from the external device and the processor in the device.

The present invention can provide the technique that, when performing synchronization processing between a plurality of processors connected by an extension bus, ensures the order of memory accesses to memory for use in the synchronization processing without deteriorating performance.

BRIEF DESCRIPTION OF THE DRAWINGS

Exemplary features and advantages of the present invention will become apparent from the following detailed description when taken with the accompanying drawings in which.

EXAMPLE EMBODIMENT

Hereinafter, example embodiments of the present invention will be described in detail with reference to the drawings.

First Example Embodiment

Figure 1:
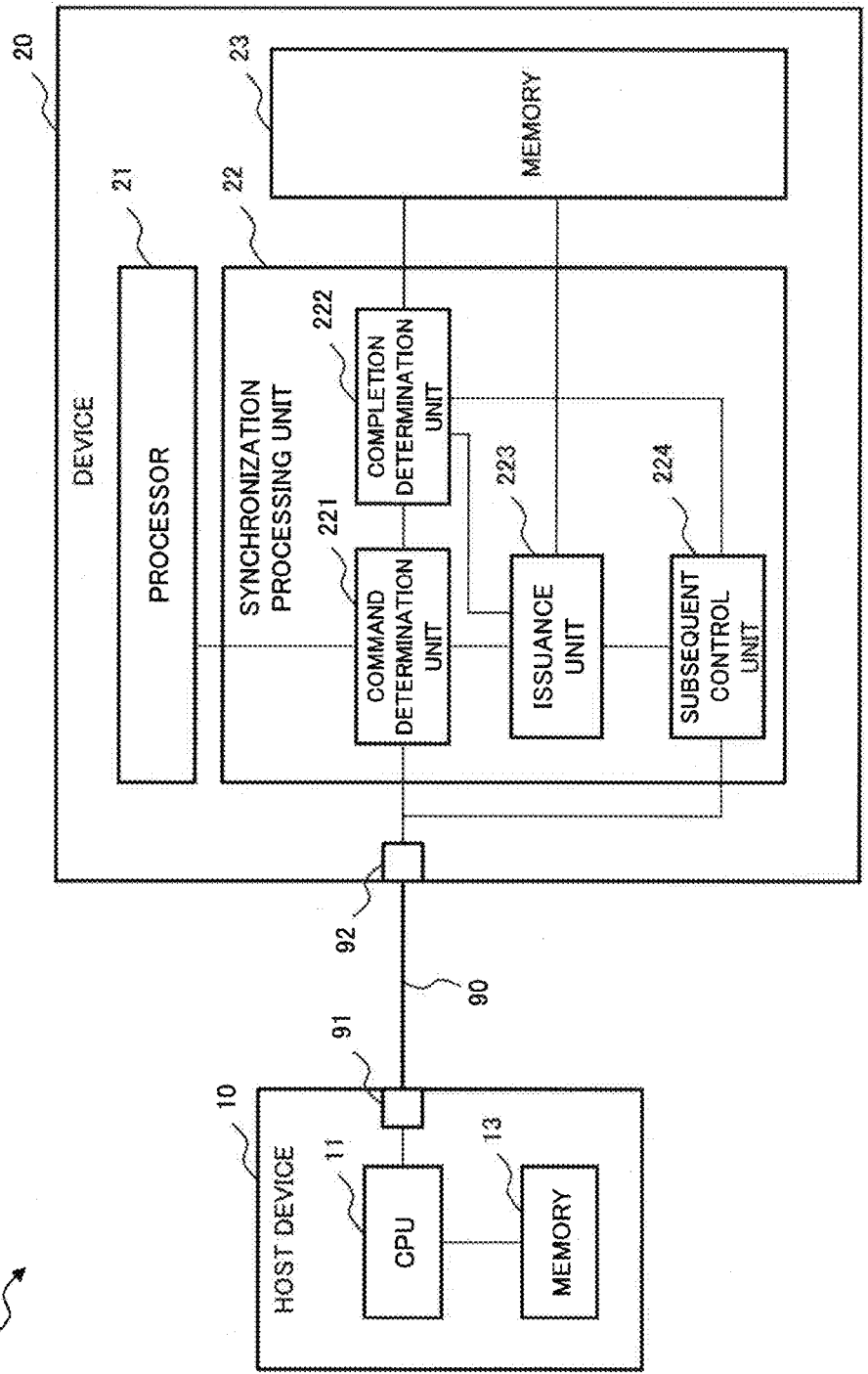
FIG. 1 is a block diagram depicting the structure of a system as a first example embodiment of the present invention.

FIG. 1 depicts a structure of a system 1 as a first example embodiment of the present invention. In FIG. 1, the system 1 includes a host device 10 and a device 20. The host device 10 and the device 20 are connected to each other by an extension bus 90 that connects extension bus interfaces 91 and 92 to each other. The host device 10 includes a CPU (Central Processing Unit) 11 and a memory 13. The host device 10 forms one example of an example embodiment of an external device in the present invention. The device 20 includes a processor 21, a synchronization processing unit 22, and a memory 23. The synchronization processing unit 22 includes a command determination unit 221, a completion determination unit 222, an issuance unit 223, and a subsequent control unit 224. The synchronization processing unit 22 is also executed by a synchronization processing device or a synchronization processing circuitry.

The memory 13 of the host device 10 stores at least a program and various kinds of data for performing synchronization processing with the device 20. The CPU 11 reads and executes the program and the various kinds of data from the memory 13 to perform synchronization processing with the device 20. In synchronization processing, the CPU 11 issues a memory access command for accessing the memory 23 in the device 20 to the device 20.

The memory 23 of the device 20 stores at least a program and various kinds of data for performing synchronization processing with the host device 10. The processor 21 reads and executes the program and the various kinds of data from the memory 23 to perform synchronization processing with the host device 10. In synchronization processing, the processor 21 issues a memory access command for accessing the memory 23.

Next, a description will be given of respective functional blocks of the synchronization processing unit 22.

The command determination unit 222 receives the memory access command for accessing the memory 23 from the host device 10 or the processor 21, and determines whether or not the received memory access command is a command for synchronization processing for instructing synchronization processing.

The completion determination unit 222 determines whether or not the memory access command issued to the memory 23 has been completed.

The issuance unit 223 issues a memory access command determined not to be a command for synchronization processing to the memory 23. Additionally, the issuance unit 223 suspends a memory access command determined to be a command for synchronization processing until the completion determination unit 222 determines that a preceding memory access command is complete, and then issues the memory access command to the memory 23. The preceding memory access command is a memory access command received before the memory access command determined to be a command for synchronization processing and issued to the memory 23.

The subsequent control unit 224 performs control so that a subsequent memory access command is not received during a period from suspension of the memory access command for synchronization processing to issuance thereof and then to completion thereof. Specifically, the subsequent control unit 224 continuously sends control information representing "busy" to the extension bus 90 and the processor 21 during the relevant period of time to thereby prohibit a subsequent memory access command from being received.

Figure 2:
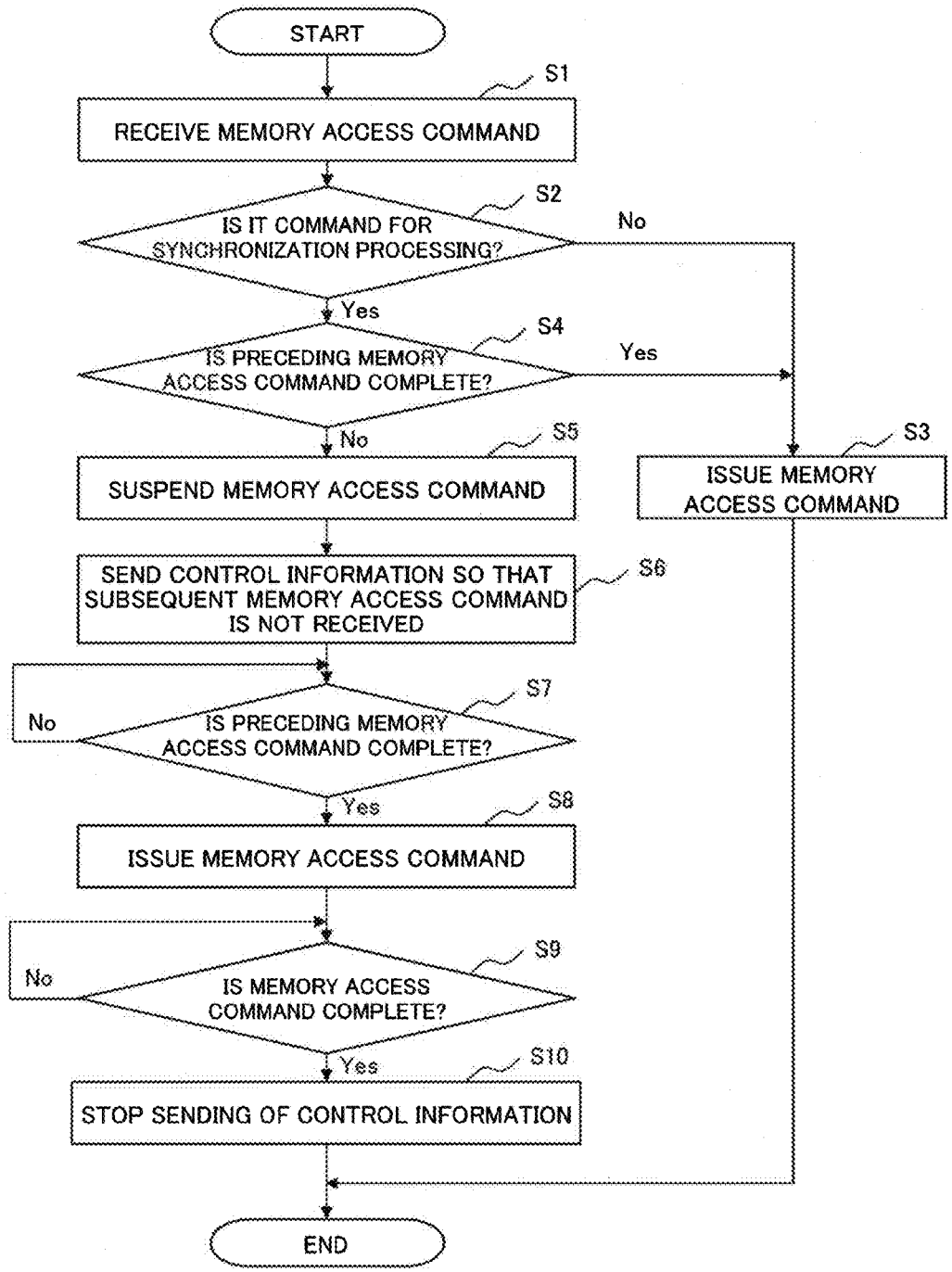
FIG. 2 is a flowchart illustrating operations of a synchronization processing unit in the first example embodiment of the present invention.

Operations of the system 1 thus formed will be described with reference to FIG. 2.

First, the synchronization processing unit 22 receives a memory access command to the memory 23 (step S1). The memory access command is received from the host device 10 or the processor 21.

Next, in the synchronization processing unit 22 of the device 20, the command determination unit 221 determines whether or not the received memory access command is a command for synchronization processing (step S2).

When the command determination unit 221 determines that it is not a command for synchronization processing, the issuance unit 223 issues the memory access command to the memory 23 (step S3). In this case, the operations of the synchronization processing unit 22 relating to the memory access command is ended.

In addition, when the command determination unit 221 determines that it is a command for synchronization processing, the completion determination unit 222 determines whether a preceding memory access command received before the memory access command for synchronization processing is complete or not (step S4).

When the completion determination unit 222 determines that the preceding memory access command is complete, the issuance unit 223 does not suspend and issues the memory access command for synchronization processing (step S3). In this case, the operations of the synchronization processing unit 22 relating to the memory access command is ended.

On the other hand, when the completion determination unit 222 determines that the memory access command is not complete, the issuance unit 223 suspends issuance of the memory access command for synchronization processing (step S5).

In addition, the subsequent control unit 224 sends control information to the extension bus 90 and the processor 21 so that a subsequent memory access command is not received (step S6).

Then, the completion determination unit 222 determines whether a preceding memory access command is complete or not (step S7). When the preceding memory access command is not complete, the completion determination unit 222 repeats the step.

When the completion determination unit 222 determines that the preceding memory access command is complete (Yes at step S7), the issuance unit 223 issues the suspended memory access command for synchronization processing (step S8).

Next, the subsequent control unit 224 determines whether the memory access command for synchronization processing issued at step S8 has been completed or not (step S9). When the memory access command for synchronization processing has not been completed, the subsequent control unit 224 repeats the step.

Then, when the memory access command for synchronization processing is complete (Yes at step S9), the subsequent control unit 224 stops sending of the control information so that a subsequent memory access command will be received (step S10).

This is the end of the description of the operations of the system 1.

Next will be a description of advantageous effects of the first example embodiment of the present invention.

In performing synchronization processing between a plurality of processors connected by an extension bus, the system 1 as the first example embodiment of the present invention can ensure the order of memory access commands to memory for use in the synchronization processing without deteriorating performance.

The reason for that is as follows. In the present example embodiment, the synchronization processing unit in the device is configured so as to be operated as follows when synchronization processing between the host device and the device connected by the extension bus is performed by using the memory in the device. Specifically, upon receipt of a memory access command for accessing the memory in the device from the host device or the processor in the device, the command determination unit determines whether or not the memory access command is a command for synchronization processing. Additionally, the completion determination unit determines whether or not a preceding memory access command received before a memory access command determined to be a command for synchronization processing is complete. Further, the issuance unit issues a memory access command determined not to be a command for synchronization processing to the memory. In addition, the issuance unit suspends issuance of the memory access command determined to be a command for synchronization processing until completion of the preceding memory access command is determined, and then issues the suspended memory access command. And, the subsequent control unit performs control so that a subsequent memory access command is not received from the external device and the processor in the device during the period from the suspension of the memory access command for synchronization processing to the issuance thereof and then to the completion thereof.

With such a structure, the present example embodiment issues, to the memory, a memory access command for synchronization processing issued to the device from the host device connected by the extension bus after completion of a preceding memory access command not for synchronization processing in the device. Thereby, the present example embodiment can ensure the order of issuance of the memory access command not for synchronization processing and the memory access command for synchronization processing to the memory in the device.

For example, in the above-described release process, the host device writes data to be delivered into the memory of the device by using the memory access command not for synchronization processing. After that, the host device writes a flag for notifying the delivery of the data into the memory of the device by using the memory access command for synchronization processing. Additionally, the processor in the device regularly performs polling (reading) of the flag in the memory by using the memory access command for synchronization processing. In the present example embodiment, the order of the write command not for synchronization processing, the write command for synchronization processing, and the read command for synchronization processing is ensured until the commands reach the device from the host device and then reach the memory in the device. Thus, the present example embodiment can perform synchronization processing between the host device and the device connected to each other by the extension bus by using the memory in the device in a manner as to ensure the order of issuance of memory access commands.

Second Example Embodiment

Next, a second example embodiment of the present invention will be described in detail with reference to the drawings. In addition, in the respective drawings that will be referred to in the description of the present example embodiment, the same structures and steps to be operated in the same manner as in the first example embodiment of the present invention are denoted by the same reference signs, and detailed descriptions thereof will be omitted in the present example embodiment.

Figure 3:
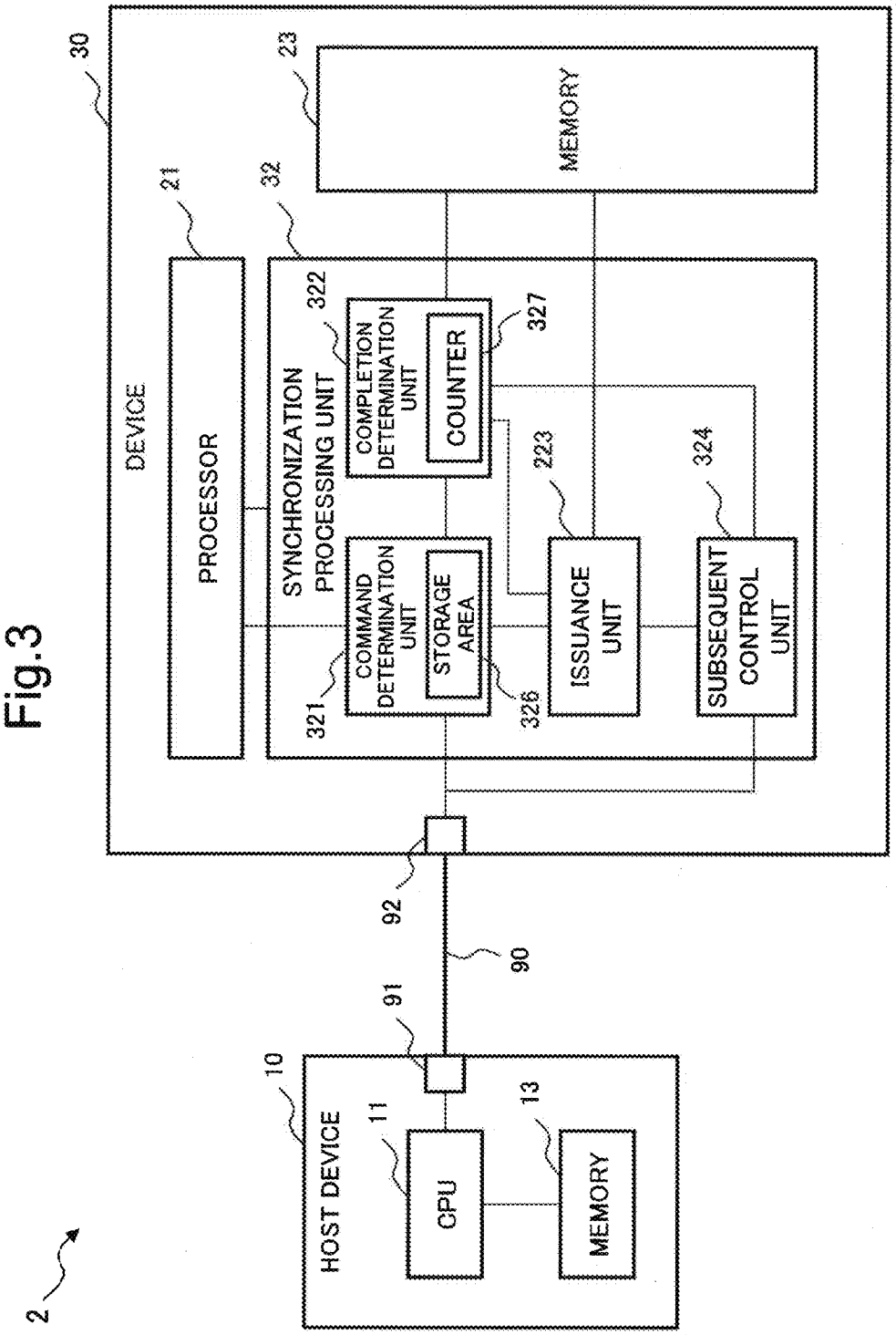
FIG. 3 is a block diagram depicting the structure of a system as a second example embodiment of the present invention.

First, FIG. 3 depicts a structure of a system 2 as the second example embodiment of the present invention. In FIG. 3, the system 2 includes the host device 10 and a device 30 connected by the extension bus 90. The device 30 is different from the device 20 in the first example embodiment of the present invention in that the former includes a synchronization processing unit 32 instead of the synchronization processing unit 22. Additionally, the synchronization processing unit 32 is different from the synchronization processing unit 22 of the first example embodiment of the present invention in that the former includes a command determination unit 321 instead of the command determination unit 221, a completion determination unit 322 instead of the completion determination unit 222, and a subsequent control unit 324 instead of the subsequent control unit 224.

The command determination unit 321 includes a storage area 326. The storage area 326 stores information representing an area for synchronization processing of the memory 23. The area for synchronization processing is an area in the memory 23 in which information for instructing synchronization processing to the memory 23 is to be stored. It is assumed that the information can be written into the storage area 326 from the host device 10 or from the processor 21 of the device 30.

In addition, on the basis of whether or not an area in the memory 23 that is the target of a received memory access command is included in the area for synchronization processing represented by the storage area 326, the command determination unit 321 determines whether or not the memory access command is a command for synchronization processing.

The completion determination unit 322 includes a counter 327. Then, the completion determination unit 322 increments a value of the counter 327 when a memory access command is issued to the memory 23. Additionally, the completion determination unit 322 decrements the value of the counter 327 when completion of the memory access command is notified. If the memory access command is a memory write, the notification of the completion is notification of write completion, and if the memory access command is a memory read, the notification of the completion is receipt of read data.

Additionally, on the basis of the value of the counter 327, the completion determination unit 322 determines whether the memory access command issued to the memory 23 is complete or not. Specifically, the completion determination unit 322 determines that there is a memory access command that is not complete if the value of the counter 327 is not "0". In addition, if the value of the counter 327 is "0", the completion determination unit 322 determines that there is no memory access command that is not completed.

The subsequent control unit 324 is not only configured similarly to the subsequent control unit 224 in the first example embodiment of the present invention, but also, on the basis of the value of the counter 327 of the completion determination unit 322, stops sending of control information that is sent after suspension of a memory access command for synchronization processing. Specifically, the subsequent control unit 324 sends control information and then cyclically checks the value of the counter 327. Then, when the value of the counter 327 becomes "0", the subsequent control unit 324 stops sending of the control information.

Here, after sending of the control information, the operation in which a preceding memory access command is completed and the value of the counter 327 becomes "0" and the operation in which a suspended memory access command for synchronization processing is issued and the value of the counter 327 is incremented are executed in the same cycle. Thus, in cyclically checking the value of the counter 327 by the subsequent control unit 324, the value of the counter 327 does not become "0" until the memory access command for synchronization processing is suspended, issued, and then completed.

Figure 4:
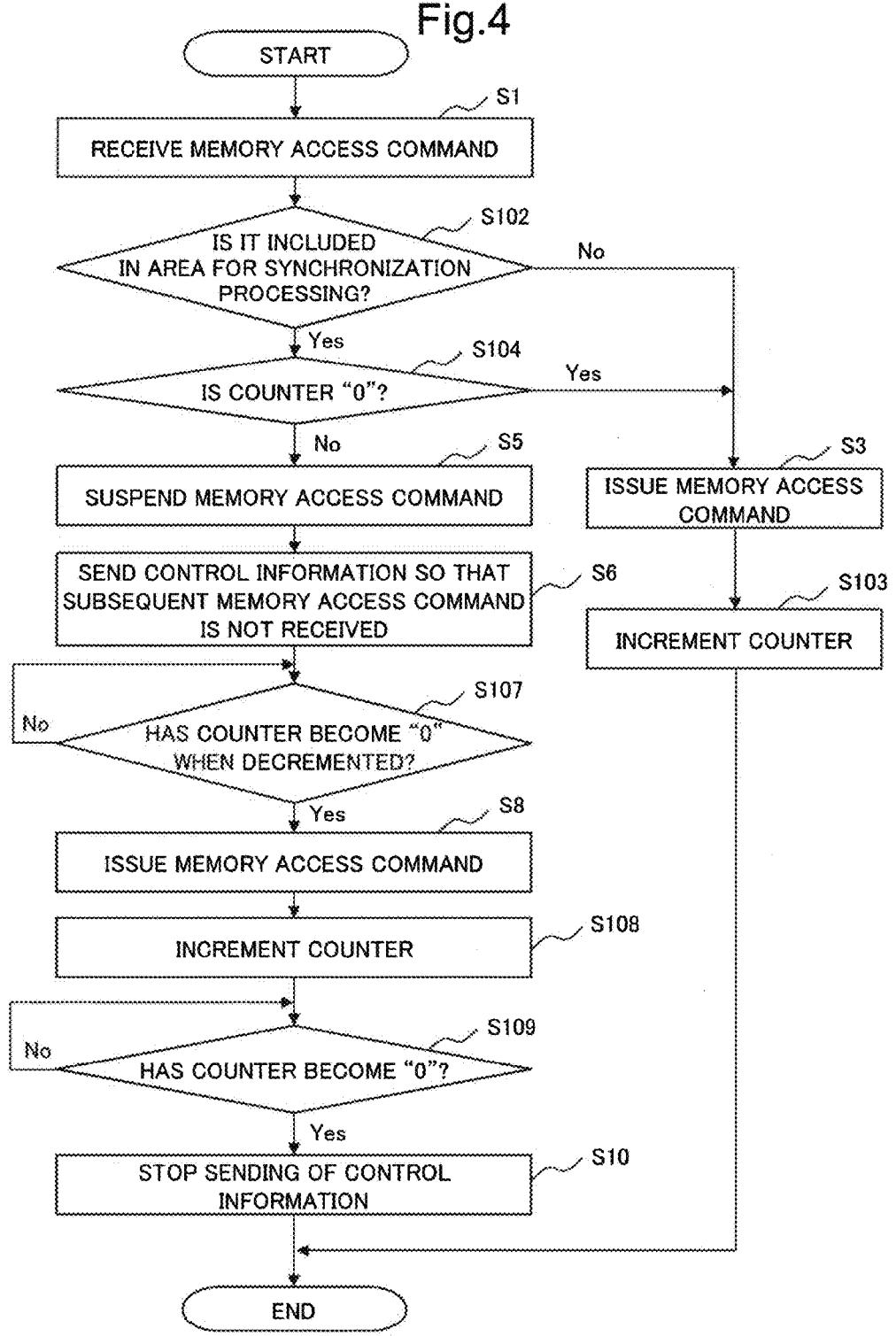
FIG. 4 is a flowchart illustrating operations of a synchronization processing unit in the second example embodiment of the present invention.

Operations of the system 2 thus formed will be described with reference to FIG. 4.

First, the synchronization processing unit 32 receives a memory access command to the memory 23 in the device 30, as in the first example embodiment of the present invention (step S1).

Next, in the synchronization processing unit 32 of the device 30, the command determination unit 321 determines whether or not an area in the memory 23 that is a target of the received memory access is included in an area for synchronization processing represented by information stored in the storage area 326 (step S102).

Next, a description will be given of a case where the command determination unit 321 has determined that the area in the memory 23 that is the target of the memory access command is not included in the area for synchronization processing. In this case, the issuance unit 223 issues the memory access command to the memory 23 (step S3).

Next, the completion determination unit 322 increments the value of the counter 327 since the memory access command has been issued (step S103).

On the other hand, a description will be given of a case where the command determination unit 321 has determined that the area in the memory 23 that is the target of the memory access command is included in the area for synchronization processing. In this case, the completion determination unit 322 determines whether the value of the counter 327 is "0" or not (step S104).

In addition, as described above, the counter 327 is configured so as to increment the value thereof in response to the issuance of a memory access command and decrement the value thereof in response to the notification of completion. If the value of the counter 327 is "0", a preceding memory access command is complete. If the value of the counter 327 is not "0", a preceding memory access command is not complete.

Here will be described a case where the value of the counter 327 has been determined to be "0". In this case, the issuance unit 223 does not suspend and issues a memory access command for synchronization processing (step S3).

Next, the completion determination unit 322 increments the value of the counter 327 since the memory access command has been issued (step S103).

On the other hand, a description will be given of a case where the value of the counter 327 has been determined not to be "0". In this case, the issuance unit 223 suspends issuance of the memory access command for synchronization processing (step S5).

Additionally, the subsequent control unit 324 sends control information to the extension bus 90 and the processor 21 so as to prohibit a subsequent memory access command from being received (step S6). After this, the subsequent control unit 324 cyclically checks the value of the counter 327.

In addition, when completion of the memory access command is notified, the completion determination unit 322 decrements the value of the counter 327 and determines whether the value thereof has become "0" or not (step S107). When the value of the counter 327 is not "0", the completion determination unit 322 repeats the step.

Here, a description will be given of a case where the completion determination unit 322 has detected that the value of the counter 327 has become "0" (Yes at step S107).

In this case, the issuance unit 223 issues the suspended memory access command for synchronization processing (step S8).

Next, the completion determination unit 322 increments the value of the counter 327 since the memory access command for synchronization processing has been issued (step S108).

Here, as described above, the operation in which the value of the counter 327 becomes "0" due to completion of the preceding memory access command and the operation in which the memory access command for synchronization processing is issued and thereby the value of the counter 327 is incremented are executed in the same cycle. Thus, in cyclically checking the value of the counter 327 by the subsequent control unit 324, the value of the counter 327 is not "0".

Next will be a description of a case where the subsequent control unit 324 has detected that the value of the counter 327 is "0" (Yes at step S109). In this case, the memory access command for synchronization processing issued after having been suspended is complete.

Thus, the subsequent control unit 324 stops sending of the control information (step S10).

This is the end of the description of the operations of the system 2.

Next, specific examples of the structure and the operations of the system 2 will be described with reference to FIGS. 5 to 8.

<Specific Example of Structure>

Figure 5:
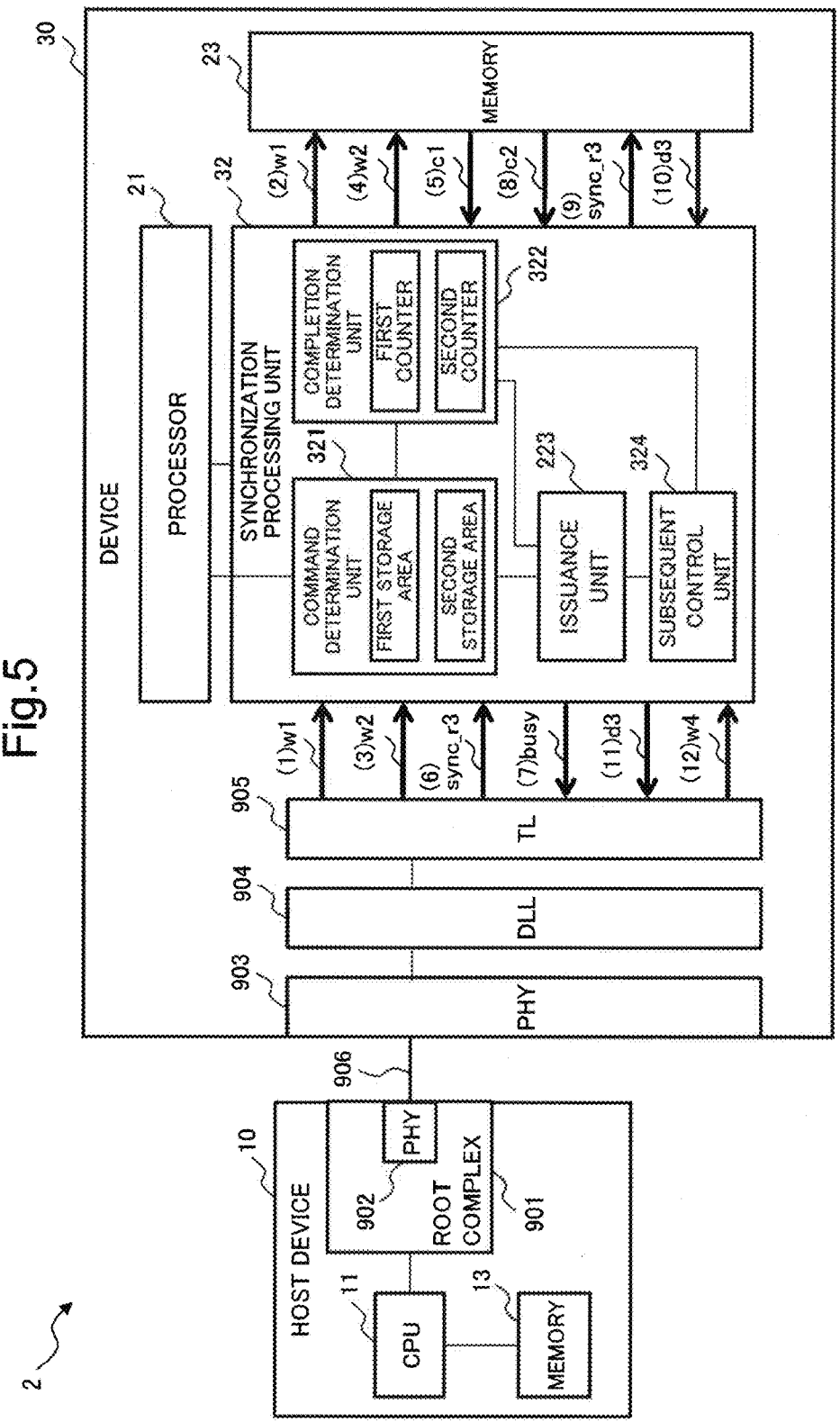
FIG. 5 is a diagram illustrating the structure of a specific example of the system as the second example embodiment of the present invention and a first operation by the specific example thereof.

First, a specific example of the structure of the system 2 will be described with reference to FIG. 5. In FIG. 5, the host device 10 and the device 30 are connected to each other by the extension bus 90 in accordance with PCIe standards. In this example, the device 30 is an endpoint in the PCIe.

Specifically, the host device 10 includes a root complex 901 of the PCIe, in addition to the CPU 11 and the memory 13. In the root complex 901, a PHY 902 as an element that performs processing of a physical layer of the PCIe is connected to a PHY 903 via a link 906. The PHY 903 is an element that performs processing of a physical layer of the PCIe in the device 30.

Additionally, the device 30 includes the PHY 903, a DLL 904, and a TL 905 in order to be connected to the extension bus 90 in accordance with the PCIe standards, in addition to the processor 21, the memory 23, and the synchronization processing unit 32. The PHY 903 is the element that performs processing of the physical layer of the PCIe in the device 30, as described above. The DLL 904 is an element that performs processing of a data-link layer of the PCIe in the device 30. The TL 905 is an element that performs processing of a transaction layer of the PCIe in the device 30. In the device 30, the synchronization processing unit 32 is connected to the link 906 via the TL 905, the DLL 904, and the PHY 903. Additionally, in this specific example, the memory 23 is formed by including RAM (Random Access Memory) and a resistor.

In addition, it is assumed that the ordering of PCIe transactions from input/output by the PHY 902 to input/output by the synchronization processing unit 32 follows the specification of the PCIe and implementation thereof.

Additionally, in FIG. 5, the synchronization processing unit 32 includes a first storage area and a second storage area as the storage area 326. When an address in the memory 23 is 64 bits long, the first storage area and the second storage area are individually an area of 64 bits. For example, in the first storage area, an address that is a starting point of an area determined for synchronization processing in the memory 23 is stored as first area information in advance. Additionally, in the second storage area, information for determining whether or not an address that is the target of a memory access command is included in the area whose starting point is the first area information is stored as second area information in advance. For example, if the area determined for synchronization processing in the memory 23 is a continuous area, bits in an upper appropriate range of the second area information may be set to "1", and lower portions other than those may be set to "0". Alternatively, if the area determined for synchronization processing in the memory 23 is regularly dispersed, bits in a lower appropriate range of the second area information may be set to "1", and upper portions other than those may be set to "0".

In this case, the command determination unit 321 can determine whether or not the area as the target of a received memory access command is an area for synchronization processing on the basis of whether the following formula (I) holds or not.

$$\text{Target address } [0:63] \text{ \& first area information } [0:63] \\ ==\text{second area information } [0:63] \qquad (I)$$

Here, in formula (I), "&" represents logical AND, and "==" represents a comparative operator that is true if both sides are equal.

In addition, it is assumed that the first storage area and the second storage area are accessible by the CPU 11 and the root complex 901 of the host device 10 or by the processor 21 of the device 30. In the first storage area and the second storage area, the first area information and the second area information are stored in advance by access from any of the elements.

Additionally, in FIG. 5, the synchronization processing unit 32 includes a first counter and a second counter as the counter 327. The value of the first counter is incremented when a memory write command is issued to the memory 23, and the value thereof is decremented when completion of the memory write command is notified. In addition, the value of the second counter is incremented when a memory read command is issued to the memory 23, and the value thereof is decremented when read data is returned.

The subsequent control unit 324 asserts a busy signal to the TL 905 and the processor 21 when a memory access command to an address for synchronization processing is suspended. Additionally, after that, the subsequent control unit 324 cyclically checks the values of the first and second counters. Then, when the values of the first and second counters become both "0", the subsequent control unit 324 deasserts the busy signal.

The issuance unit 223 issues a memory access command determined not to be a memory access to the address for synchronization processing by the command determination unit 321 to the memory 23.

Additionally, the issuance unit 223 does not issue and suspends a memory access command determined to be a command for synchronization processing by the command determination unit 321 if either of the values of the first and second counters is not "0".

Additionally, the issuance unit 223 issues the suspended memory access command for synchronization processing if the values of the first and second counters become both "0" at the time of notification of completion of the memory access command.

In such a structure, specific examples 1 to 4 of the operations will be described.

<Specific Example 1 of Operations>

A specific example 1 of the operations will be described with reference to FIG. 5. In FIG. 5, it is assumed that the host device 10 issues four PCIe transactions: a write command w1, a write command w2, a read command sync_r3 for synchronization processing, and a write command w4 to the memory 23 of the device 30. The four PCIe transactions are assumed to be issued in this order and reach the synchronization processing unit 32 in the order of the issuance. Additionally, the write command w1, the write command w2, and the write command w4 are assumed to be commands to addresses not for synchronization processing. Additionally, the read command sync_r3 for synchronization processing is assumed to be a command to an address for synchronization processing. Furthermore, in the following descriptions of the specific examples, it is assumed that the values of the first and second counters are "0" at a time of start of the operation.

(1) First, upon receipt of the write command w1 from the TL 905, the synchronization processing unit 32 inputs an address that is a target of the write command w1 into the command determination unit 321 to determine whether or not the address is an address for synchronization processing.

(2) Here, the address is determined not to be an address for synchronization processing. Then, the synchronization processing unit 32 increments the first counter by "1" and issues the write command w1 to the memory 23 from the issuance unit 223. The value of the first counter becomes "1", and the value of the second counter is "0".

(3) Next, upon receipt of the write command w2 from the TL 905, the synchronization processing unit 32 inputs an address that is a target of the write command w2 into the command determination unit 321 to determine whether or not it is an address for synchronization processing.

(4) Here, the address is determined not to be an address for synchronization processing. Then, the synchronization processing unit 32 increments the first counter by "1" and issues the write command w2 to the memory 23 from the issuance unit 223. The value of the first counter becomes "2", and the value of the second counter is "0".

(5) Next, the synchronization processing unit 32 receives a write completion notification c1 corresponding to the write command w1 from the memory 23. Then, the synchronization processing unit 32 decrements the first counter by "1". The value of the first counter becomes "1", and the value of the second counter is "0".

(6) Next, upon receipt of the read command sync_r3 for synchronization processing from the TL 905, the synchronization processing unit 32 inputs an address that is a target of the read command sync_r3 into the command determination unit 321 to determine whether or not it is an address for synchronization processing.

Here, the address is determined to be an address for synchronization processing. Then, the synchronization processing unit 32 confirms the values of the first and second counters in the completion determination unit 322. Here, the value of the first counter is "1". In other words, writing by the preceding write command w2 is not complete. Thus, the synchronization processing unit 32 suspends the read command sync_r3 for synchronization processing in the issuance unit 223.

(7) Then, the synchronization processing unit 32 asserts a busy signal "busy" to the TL 905 and the processor 21 by the subsequent control unit 324. Due to the assertion of the busy signal "busy", the subsequent write command w4 is retained on the way from the PHY 902 to the TL 905.

Hereafter, checking of the first and second counters by the subsequent control unit 324 will be cyclically performed. Then, assertion of the busy signal "busy" will be continued during a period in which at least one of the values of the first counter and the second counter is not "0".

(8) Next, upon receipt of a write completion notification c2 corresponding to the write command w2, the synchronization processing unit 32 decrements the first counter by "1." The value of the first counter becomes "0", and the value of the second counter is "0". Thus, due to the decrement of the first counter, the values of the first and second counters become "0". In other words, writing by the preceding write command w2 has been completed.

(9) Thus, the synchronization processing unit 32 issues the read command sync_r3 for synchronization processing suspended in the issuance unit 223 to the memory 23 from the issuance unit 223. Additionally, the synchronization processing unit 32 increments the second counter by "1". The value of the first counter is "0", and the value of the second counter becomes "1".

Here, the operations of (8) and (9) are performed in the same cycle. Accordingly, in cyclically checking the first and second counters, either of the values of the first and second counters is not "0".

(10) Next, the synchronization processing unit 32 receives read data d3 corresponding to the read command sync_r3 for synchronization processing.

(11) Then, the synchronization processing unit 32 transmits the read data d3 to the TL 905. Additionally, the synchronization processing unit 32 decrements the second counter by "1". Thereby, the values of the first and second counters are detected to be both "0" in cyclical checking. In other words, the read command sync_r3 to the address for synchronization processing has been completed.

(12) Thus, the synchronization processing unit 32 deasserts the busy signal "busy" from the subsequent control unit 324. Due to the deassertion of the busy signal "busy", the write command w4 retained on the way from the PHY 902 to the TL 905 is received by the synchronization processing unit 32 from the TL 905.

With the operations described above, the write commands w1 and w2 received before the read command sync_r3 to the address for synchronization processing are reflected in the memory 23, followed by execution of the read command sync_r3 to the address for synchronization processing. Then, it is ensured that the write command w4 is reflected in the memory 23 after that.

Figure 6:
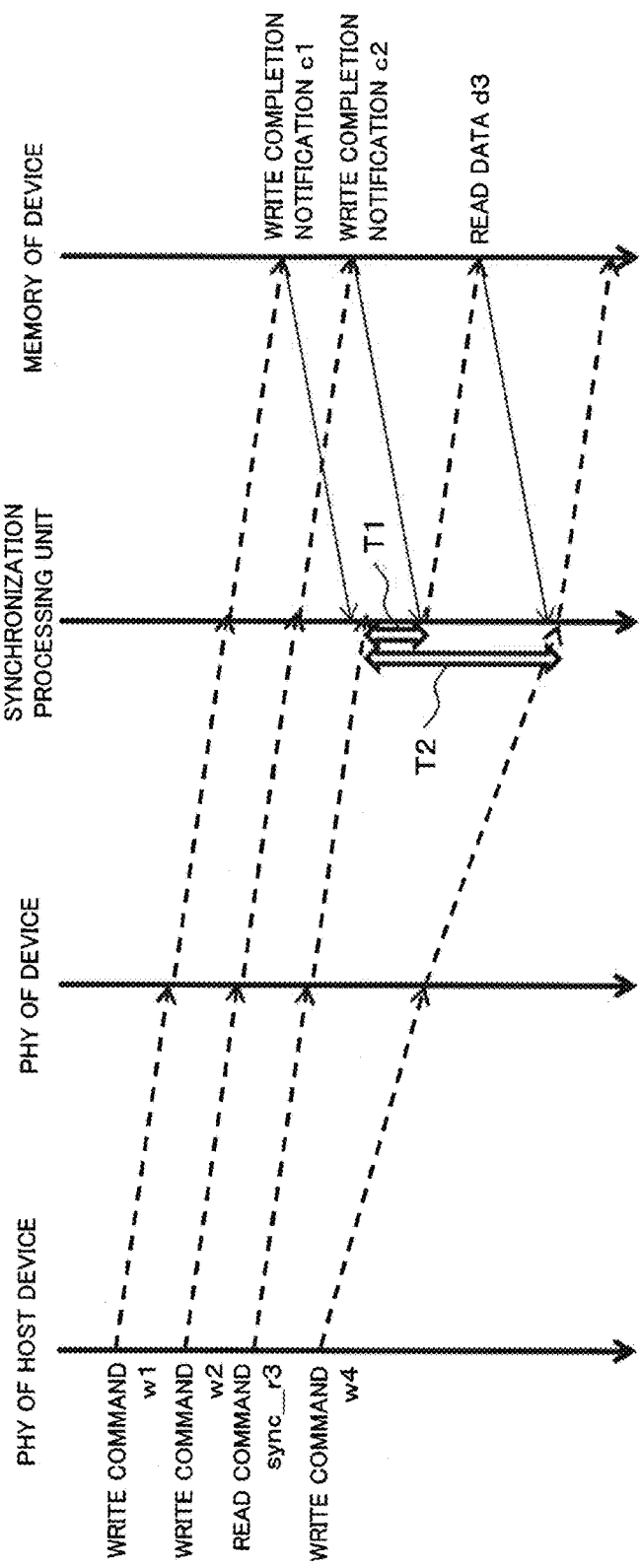
FIG. 6 is a diagram schematically illustrating the order of memory access commands that are executed in the first operation by the specific example of the system as the second example embodiment of the present invention.

FIG. 6 schematically depicts a state in which, with the operation, the order of issuance is ensured between the memory access commands not for synchronization processing and the memory access command for synchronization processing. In FIG. 6, due to setting of a period T1 for suspension of the read command sync_r3 for synchronization processing, the write commands w1 and w2 preceding the read command sync_r3 for synchronization processing are completed before issuance of the read command sync_r3 for synchronization processing. Additionally, due to setting of a period T2 for assertion of a busy signal, the write command w4 subsequent to the read command sync_r3 for synchronization processing is received and then issued after completion of the read command sync_r3 for synchronization processing.

In addition, in the specific example 1 of the operations, it is assumed that the order of the write commands w1 and w2, the read command sync_r3 to the address for synchronization processing, and the write command w4 is ensured to be unchanged on the way from the PHY 902 to the synchronization processing unit 32. For example, assume that the write commands w1 and w2 are posted requests. Additionally, assume that the read command sync_r3 to the address for synchronization processing is a non-posted read request. Furthermore, assume that the write command w4 is a non-posted request with data. In this case, as a choice in implementing PCIe, it is prerequisite to make such a choice that a non-posted request with data does not overtake a non-posted read request.

<Specific Example 2 of Operations>

A specific example 2 of the operations will be described with reference to FIG. 7. The specific example 2 is different from the above-described specific example 1 in that the read command sync_r3 for synchronization processing and the write command w4 are issued not from the host device 10 but from the processor 21 of the device 30.

Figure 7:
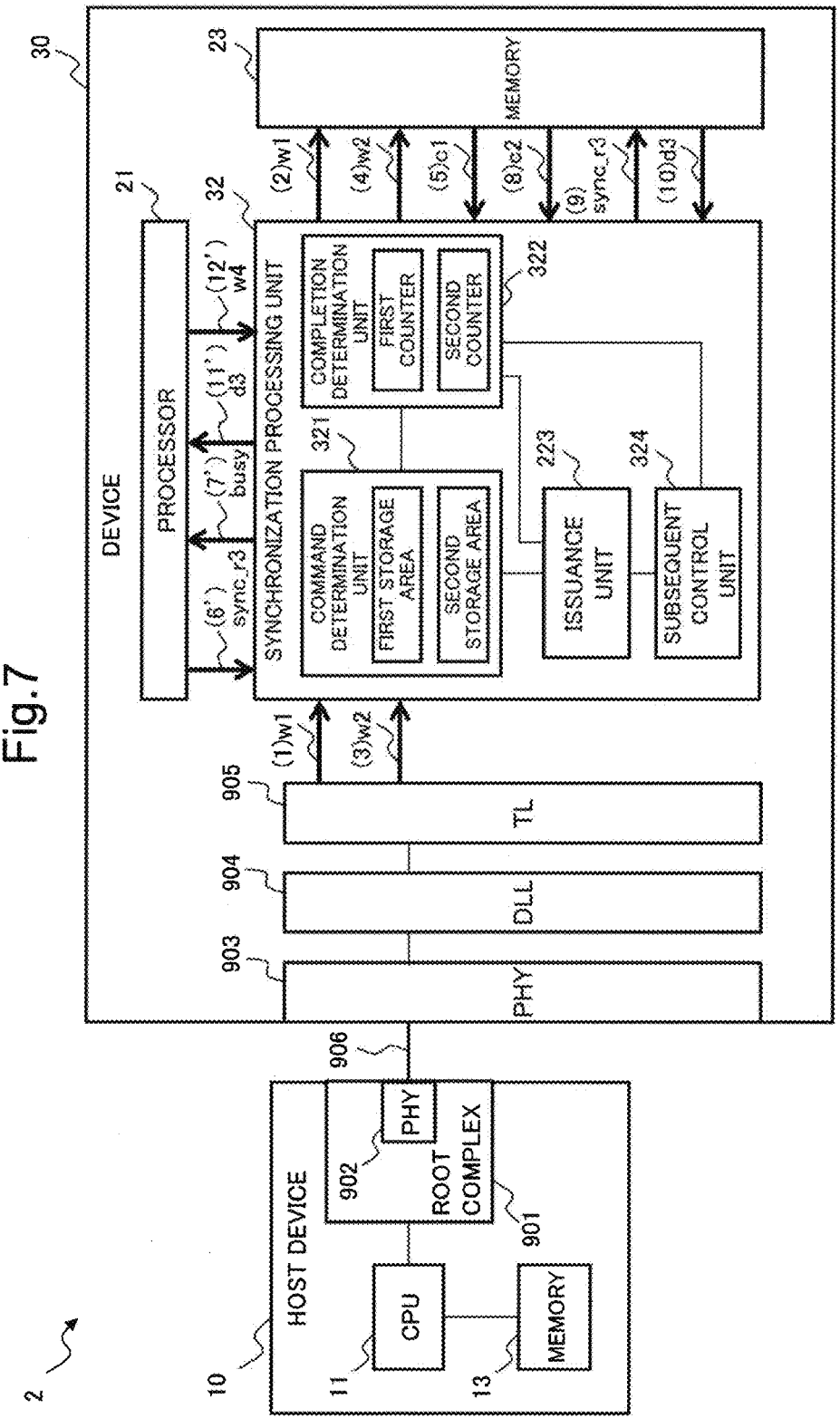
FIG. 7 is a diagram illustrating the structure of a specific example of the system as the second example embodiment of the present invention and a second operation by the specific example thereof.

In FIG. 7, it is assumed that two PCIe transactions: the write commands w1 and w2 are issued from the host device 10 to the memory 23 of the device 30. The two PCIe transactions are assumed to be issued in this order and reach the synchronization processing unit 32 in the order of the issuance. Additionally, the read command sync_r3 for synchronization processing and the write command w4 are assumed to be issued in this order from the processor 21 of the device 30 to the memory 23 of the device 30. Additionally, the read command sync_r3 for synchronization processing is assumed to reach the synchronization processing unit 32 subsequently to the write command w2 from the host device 10. Additionally, the write commands w1, w2, and w4 are assumed to be commands to an address not for synchronization processing. Additionally, the read command sync_r3 for synchronization processing is assumed to be a command to an address for synchronization processing. Furthermore, as in the specific example 1, the values of the first and second counters are assumed to be "0" at the time of start of the operation.

In this case, the synchronization processing unit 32 is different from that in the above-described specific example 1 in that the former is operated as in (6'), (7'), (11'), and (12') below instead of (6), (7), (11), and (12).

(6') Here, the synchronization processing unit 32 receives the read command sync_r3 for synchronization processing from the processor 21 of the device 30. The operation after this is the same as that of (6) in the specific example 1.

(7') Here, the synchronization processing unit 32 asserts a busy signal "busy" to the TL 905 and the processor 21 by the subsequent control unit 324. Due to the assertion of the busy signal "busy", the subsequent write command w4 is retained on the way from the synchronization processing unit 32 to the processor 21.

(11') Here, the synchronization processing unit 32 transmits the read data d3 to the processor 21 of the device 30. The operation hereinafter is the same as that of (11) in the specific example 1.

(12') Here, the synchronization processing unit 32 deasserts the busy signal "busy" from the subsequent control unit 324. Due to the deassertion of the busy signal "busy", the write command w4 retained on the way from the synchronization processing unit 32 to the processor 21 is received by the synchronization processing unit 32.

With the operations described hereinabove, the read command sync_r3 to the address for synchronization processing received from the processor 21 of the device 30 is issued to the memory 23 after the write commands w1 and w2 received from the host device 10 before the read command sync_r3 are reflected in the memory 23. Then, it is ensured that the write command w4 from the processor 21 is reflected in the memory 23 after that.

Figure 8:
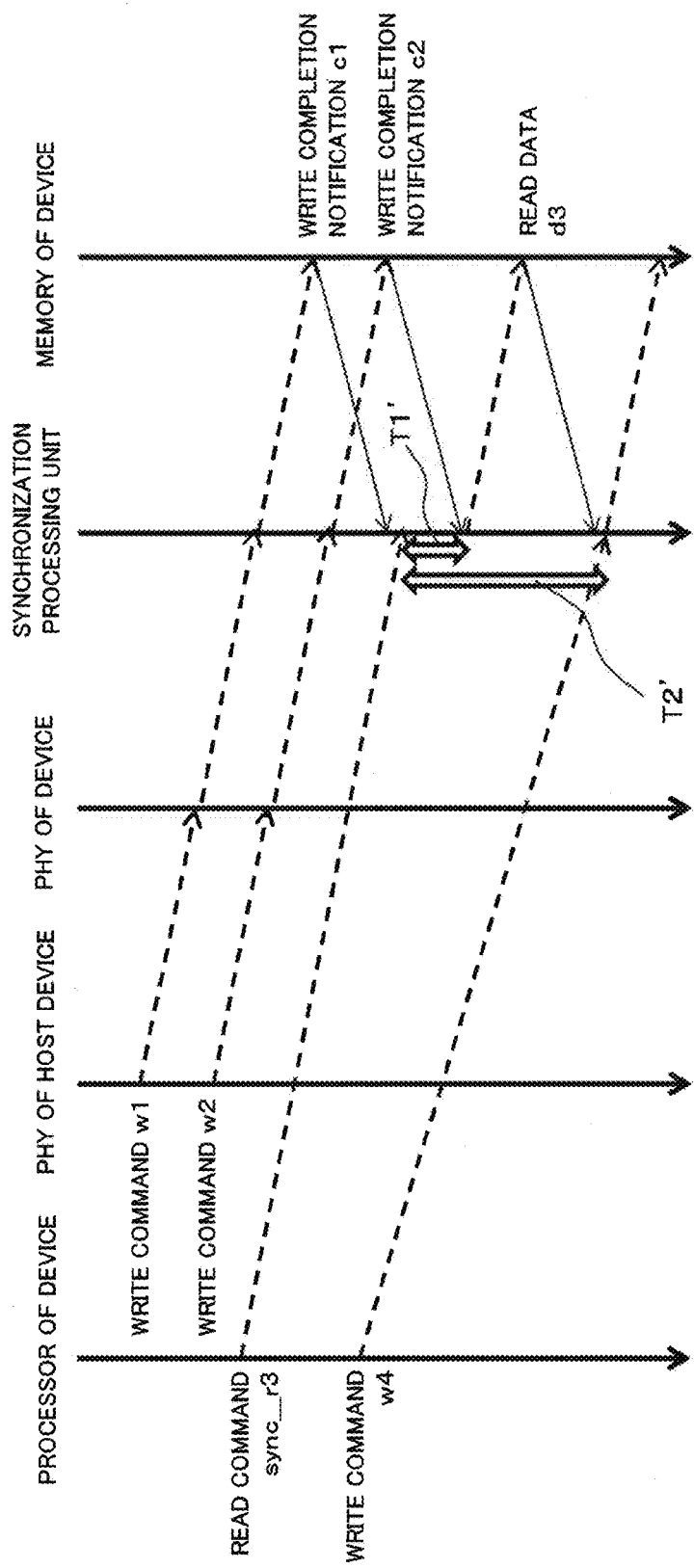
FIG. 8 is a diagram schematically illustrating the order of memory access commands that are executed in the second operation by the specific example of the system as the second example embodiment of the present invention.

FIG. 8 schematically depicts a state in which the order of issuance is ensured between the memory access commands not for synchronization processing from the host device 10 and the processor 21 of the device 30 and the memory access command for synchronization processing from the processor 21. The write commands w1 and w2 from the host device 10 preceding the read command sync_r3 for synchronization processing from the processor 21 are completed before issuance of the read command sync_r3, due to setting of a period T1' for suspension of the read command sync_r3 for synchronization processing. Additionally, the write command w4 subsequent to the read command sync_r3 for synchronization processing from the processor 21 is received and then issued after completion of the read command sync_r3 for synchronization processing, due to setting of a period T2' for asserting a busy signal.

Thus, ensuring of the order of the memory access commands to the memory 23 in the device 30 from the host device 10 and the processor 21 of the device 30 is achieved by the memory access command for synchronization processing from the processor 21 of the device 30.

For example, assume a situation where, of the write commands w1 and w2 issued from the host device 10, the write command w2 writes a flag into the memory 23 by the release process of a release-consistency model. In this case, the processor 21 of the device 30 repeatedly reads the flag by the read command sync_r3 for synchronization processing. When the flag is established, the processor 21 determines that data written in the memory 23 by the write command w1 from the host device 10 is valid, and goes on processing.

Thereby, it is ensured that the write command w2 reaches the synchronization processing unit 32 before the read command sync_r3 at the time of establishment of the flag. Furthermore, with the ordering relationship between the read command sync_r3 for synchronization processing and the write commands w2 and w1, it is ensured that the write command w1 reaches the synchronization processing unit 32 before the read command sync_r3 for synchronization processing at the time of establishment of the flag. Accordingly, it is ensured that data is written into the memory 23 by the write command w1 before the read command sync_r3 at the time of establishment of the flag.

Thus, in the specific example 2, the write command w2 is applied as a write for writing a release-side flag by the host device 10. Additionally, the read command sync_r3 for synchronization processing is applied as a read for reading an acquire-side flag by the processor 21 of the device 30. Thereby, the specific example 2 indicates that the present example embodiment can actualize a release-consistency model, as described above.

In addition, upon implementation of the specific example 2, the processor 21 of the device 30 issues (performs polling of) the read command sync_r3 for synchronization processing until the flag is established, and issues, for example, a read command r5 according to a polling result, thereby being operated as the acquire-side. In this case, the read command r5 is issued at least after the read command sync_r3.

<Specific Example 3 of Operations>

Figure 9:
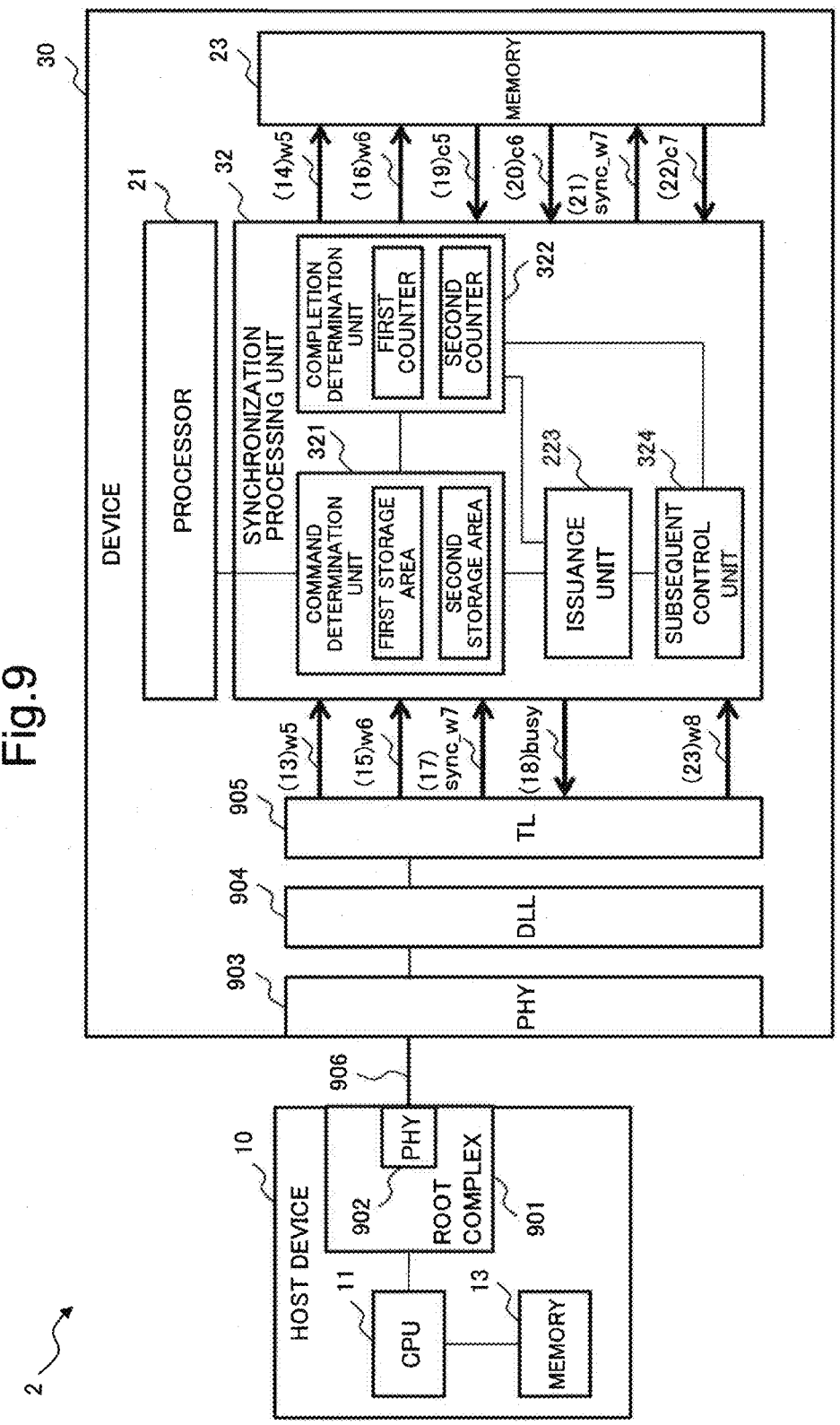
FIG. 9 is a diagram illustrating the structure of a specific example of the system as the second example embodiment of the present invention and a third operation by the specific example thereof.

A specific example 3 of the operations will be described with reference to FIG. 9. In FIG. 9, it is assumed that four PCIe transactions: a write command w5, a write command w6, a write command sync_w7 for synchronization processing, and a write command w8 are issued to the memory 23 of the device 30 from the host device 10. The four PCIe transactions are assumed to be issued in this order and reach the synchronization processing unit 32 in the order of the issuance. Additionally, the write commands w5, w6, and w8 are assumed to be commands to an address not for synchronization processing. In addition, the write command sync_w7 for synchronization processing is assumed to be a command to an address for synchronization processing. Furthermore, in the following description of the specific example, it is assumed that the values of the first and second counters are "0" at the time of start of the operation.

(13) First, upon receipt of the write command w5 from the TL 905, the synchronization processing unit 32 inputs an address that is a target of the write command w5 into the command determination unit 321 to determine whether or not it is an address for synchronization processing.

(14) Here, the address is determined not to be an address for synchronization processing. Thus, the synchronization processing unit 32 increments the first counter by "1", and issues the write command w5 to the memory 23 from the issuance unit 223. The value of the first counter becomes "1", and the value of the second counter is "0".

(15) Next, upon receipt of the write command w6 from the TL 905, the synchronization processing unit 32 inputs an address that is a target of the write command w6 into the command determination unit 321 to determine whether or not it is an address for synchronization processing.

(16) Here, the address is determined not to be an address for synchronization processing. Thus, the synchronization processing unit 32 increments the first counter by "1", and issues the write command w6 to the memory 23 from the issuance unit 223. The value of the first counter becomes "2", and the value of the second counter is "0".

(17) Next, upon receipt of the write command sync_w7 for synchronization processing from the TL 905, the synchronization processing unit 32 inputs an address that is a target of the write command sync_w7 into the command determination unit 321 to determine whether or not it is an address for synchronization processing.

Here, the address is determined to be an address for synchronization processing. Thus, the synchronization processing unit 32 confirms the values of the first and second counters in the completion determination unit 322. Here, the value of the first counter is "2". In other words, writings by the preceding write commands w5 and w6 are not complete. Thus, the synchronization processing unit 32 suspends the write command sync_w7 for synchronization processing in the issuance unit 223.

(18) Then, the synchronization processing unit 32 asserts a busy signal "busy" to the TL 905 and the processor 21 by the subsequent control unit 324. Due to the assertion of the busy signal "busy", the subsequent write command w8 is retained on the way from the PHY 902 to the TL 905.

Hereafter, checking of the first and second counters by the subsequent control unit 324 is cyclically performed. Then, the assertion of the busy signal "busy" is continued during a period in which at least either of the values of the first counter and the second counter is not "0".

(19) Next, upon receipt of a write completion notification c5 corresponding to the write command w5, the synchronization processing unit 32 decrements the first counter by "1". The value of the first counter becomes "1", and the value of the second counter is "0".

(20) Next, upon receipt of a write completion notification c6 corresponding to the write command w6, the synchronization processing unit 32 decrements the first counter by "1". The value of the first counter becomes "0", and the value of the second counter is "0". In this manner, due to the decrement of the first counter, the values of the first and second counters become "0". In other words, writings by the preceding write commands w5 and w6 have been completed.

(21) Thus, the synchronization processing unit 32 issues the write command sync_w7 for synchronization processing suspended in the issuance unit 223 to the memory 23 from the issuance unit 223. Additionally, the synchronization processing unit 32 increments the first counter by "1".

Here, the operations of (20) and (21) are performed in the same cycle. Accordingly, in the cyclical checking of the first and second counters, the value of the first counter does not become "0" since decrement and increment cancel out each other.

(22) Next, the synchronization processing unit 32 receives a write completion notification c7 corresponding to the write command sync_w7 for synchronization processing. Then, the synchronization processing unit 32 decrements the first counter by "1". Thereby, it is detected that the values of the first and second counters have become both "0" in the cyclical checking. In other words, writing by the write command sync_w7 for synchronization processing has been completed.

(23) Thus, the synchronization processing unit 32 deasserts the busy signal "busy" from the subsequent control unit 324. Due to the deassertion of the busy signal "busy", the write command w8 retained on the way from the PHY 902 to the TL 905 is received by the synchronization processing unit 32 from the TL 905.

With the operations described above, the write commands w5 and w6 received before the write command sync_w7 to the address for synchronization processing are reflected in the memory 23, and then, the write command sync_w7 to the address for synchronization processing is reflected in the memory 23. Then, it is ensured that the write command w8 is reflected in the memory 23 after that.

Figure 10:
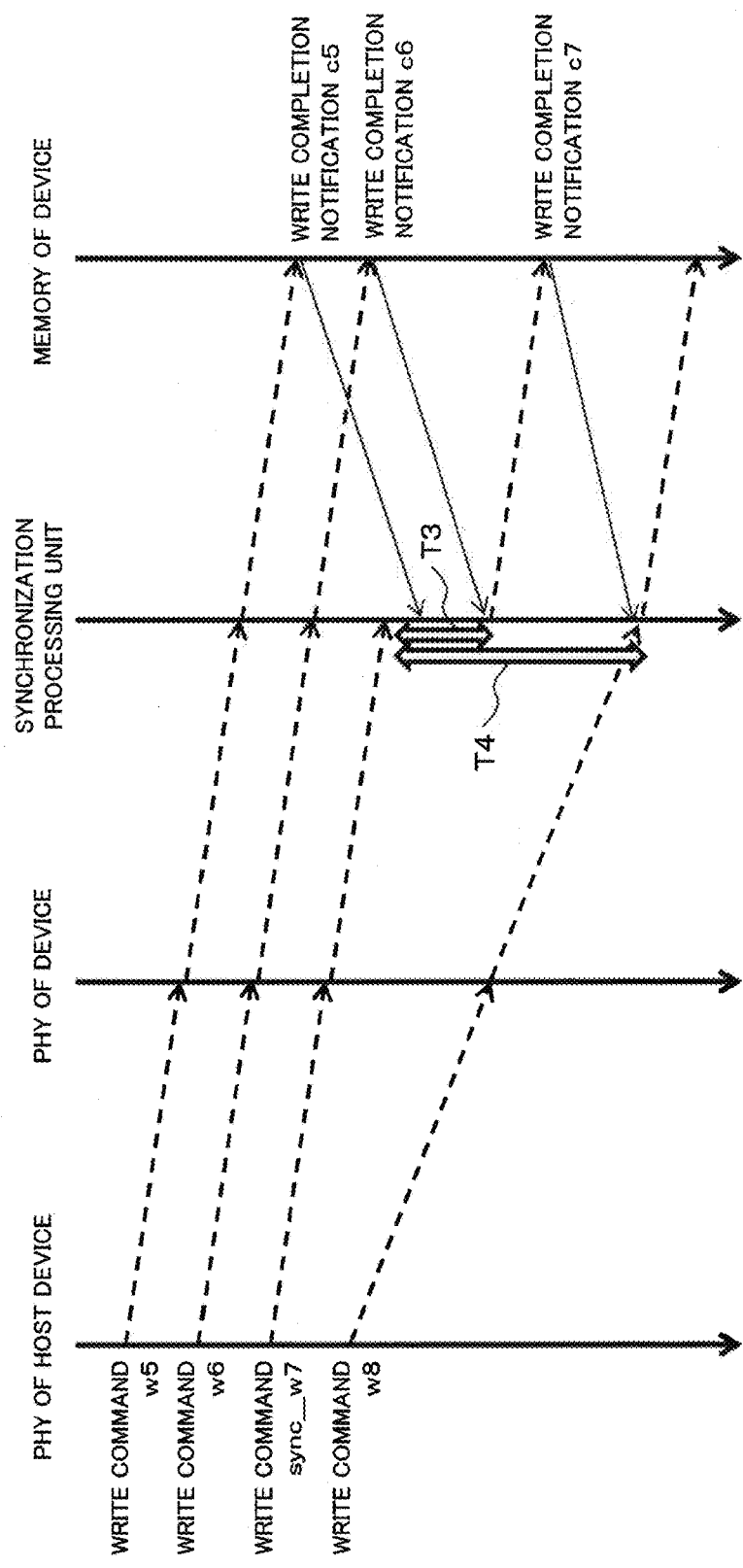
FIG. 10 is a diagram schematically illustrating the order of memory access commands that are executed in the third operation by the specific example of the system as the second example embodiment of the present invention.

FIG. 10 schematically depicts a state in which the order of issuance is ensured between the memory access commands not for synchronization processing and the memory access command for synchronization processing. In FIG. 10, due to setting of a period T3 for suspension of the write command sync_w7 for synchronization processing, the write commands w5 and w6 preceding the write command sync_w7 for synchronization processing are completed before issuance of the write command sync_w7 for synchronization processing. Additionally, due to setting of a period T4 for assertion of a busy signal, the write command w8 subsequent to the write command sync_w7 for synchronization processing is received after completion of the write command sync_w7 for synchronization processing.

Additionally, even in the specific example 3 of the operations, it is assumed that the order of the write commands w5 and w6, the write command sync_w7 for synchronization processing, and the write command w8 is ensured to be unchanged on the way from the PHY 902 to the synchronization processing unit 32. For example, assume that each of the write commands w5, w6, sync_w7, and w8 is a posted request. In this case, as a choice in implementing PCIe, it is prerequisite to make such a choice that any of the posted requests does not overtake the other posted requests.

<Specific Example 4 of Operations>

A specific example 4 of the operations will be described with reference to FIG. 11. In the specific example 4, a description will be given of a case where a write command for synchronization processing is issued not from the host device 10 but from the processor 21 of the device 30.

Figure 11:
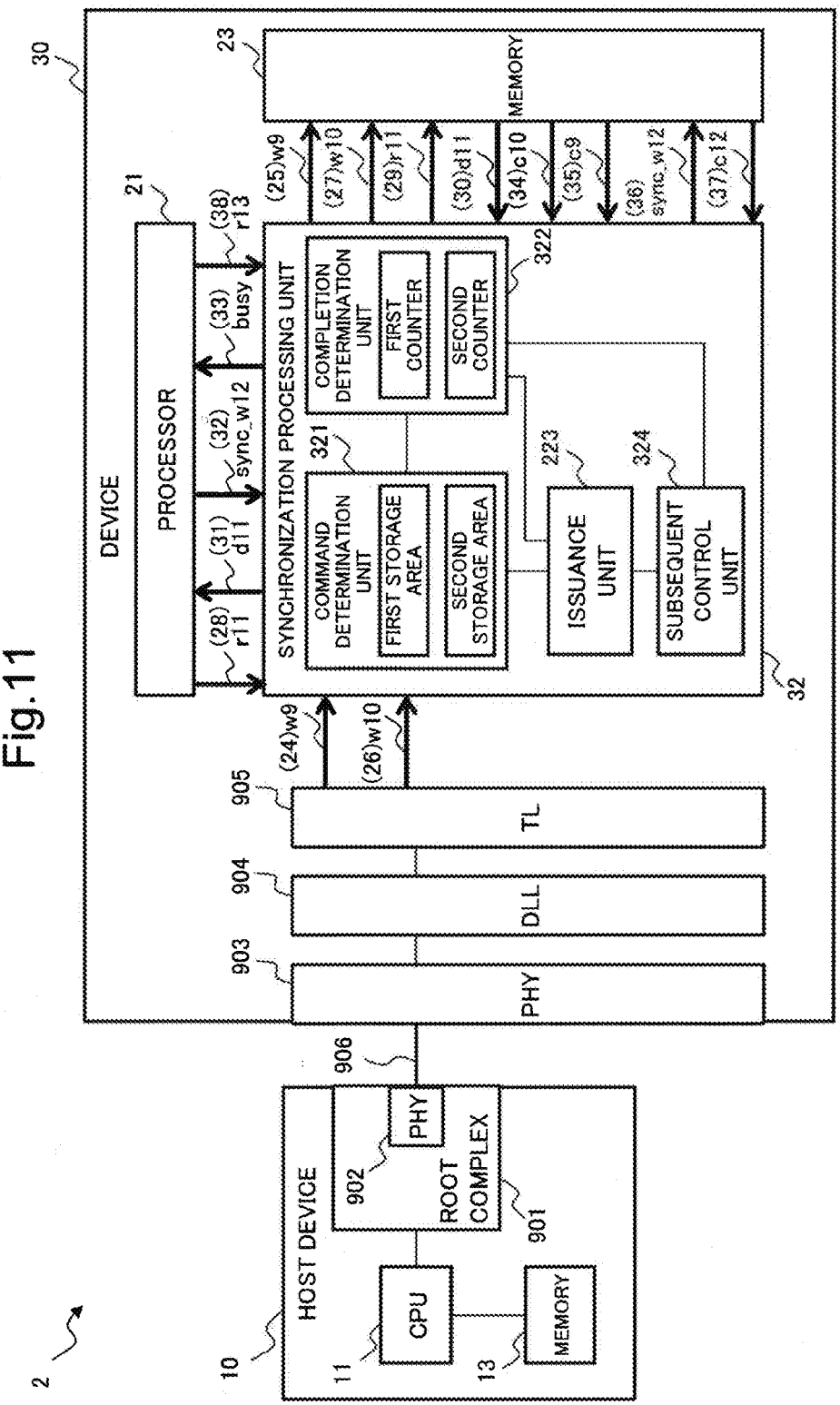
FIG. 11 is a diagram illustrating the structure of a specific example of the system as the second example embodiment of the present invention and a fourth operation by the specific example thereof.

In FIG. 11, it is assumed that two PCIe transactions: a write command w9 and a write command w10 are issued to the memory 23 of the device 30 from the host device 10. The two PCIe transactions are assumed to be issued in this order and reach the synchronization processing unit 32 in the order of the issuance. Additionally, it is assumed that a read command r11, a write command sync_w12 for synchronization processing, and a read command r13 are issued in this order to the memory 23 of the device 30 from the processor 21 of the device 30. Additionally, the read command r11 is assumed to reach the synchronization processing unit 32, subsequently to the write command w10 from the host device 10. Additionally, the write command sync_w12 for synchronization processing is assumed to be issued when read data d11 corresponding to the read command r11 is a predetermined value. Additionally, the write commands w9 and w10, and the read commands r11 and r13 are assumed to be commands to addresses not for synchronization processing. Additionally, the write command sync_w12 for synchronization processing is assumed to be a command to an address for synchronization processing. Furthermore, the values of the first and second counters are assumed to be "0" at the time of start of the operation.

(24) First, upon receipt of the write command w9 from the TL 905, the synchronization processing unit 32 inputs an address that is a target of the write command w9 into the command determination unit 321 to determine whether or not the address is an address for synchronization processing.

(25) Here, the address is determined not to be an address for synchronization processing. Thus, the synchronization processing unit 32 increments the first counter by "1" and issues the write command w9 to the memory 23 from the issuance unit 223. The value of the first counter becomes "1" and the value of the second counter is "0".

(26) Next, upon receipt of the write command w10 from the TL 905, the synchronization processing unit 32 inputs an address that is a target of the write command w10 into the command determination unit 321 to determine whether or not the address is an address for synchronization processing.

(27) Here, the address is determined not to be an address for synchronization processing. Thus, the synchronization processing unit 32 increments the first counter by "1" and issues the write command w10 to the memory 23 from the issuance unit 223. The value of the first counter becomes "2" and the value of the second counter is "0".

(28) Next, upon receipt of the read command r11 from the processor 21 of the device 30, the synchronization processing unit 32 inputs an address that is a target of the read command r11 into the command determination unit 321 to determine whether or not the address is an address for synchronization processing.

(29) Here, the address is determined not to be an address for synchronization processing. Thus, the synchronization processing unit 32 increments the second counter by "1" and issues the read command r11 to the memory 23 from the issuance unit 223. The value of the first counter remains "2", and the value of the second counter becomes "1".

(30) Next, the synchronization processing unit 32 receives read data d11 corresponding to the read command r11.

(31) Then, the synchronization processing unit 32 transmits the read data d11 to the processor 21 of the device 30. Then, the synchronization processing unit 32 decrements the second counter by "1". Thereby, the value of the first counter remains "2", and the value of the second counter becomes "0".

(32) Next, the processor 21 issues the write command sync_w12 for synchronization processing when the read data d11 is a predetermined value. Then, upon receipt of the write command sync_w12 for synchronization processing from the processor 21 of the device 30, the synchronization processing unit 32 inputs an address that is a target of the received command into the command determination unit 321 to determine whether or not the address is an address for synchronization processing.

Here, the address is determined to be an address for synchronization processing. Thus, the synchronization processing unit 32 confirms the values of the first and second counters in the completion determination unit 322. Here, the value of the first counter is "2", and the value of the second counter is "0". In other words, writings by the preceding write commands w9 and w10 are not complete. Thus, the synchronization processing unit 32 suspends the write command sync_w12 for synchronization processing in the issuance unit 223.

(33) Then, the synchronization processing unit 32 asserts a busy signal "busy" to the TL 905 and the processor 21 by the subsequent control unit 324. Due to the assertion of the busy signal "busy", the subsequent read command r13 is retained on the way from the synchronization processing unit 32 to the processor 21.

Hereafter, checking of the first and second counters is cyclically performed by the subsequent control unit 324. Then, the assertion of the busy signal "busy" is continued during a period in which at least one of the values of the first counter and the second counter is not "0".

(34) Next, upon receipt of a write completion notification c10 corresponding to the write command w10, the synchronization processing unit 32 decrements the first counter by "1". The value of the first counter becomes "1" and the value of the second counter is "0".

(35) Next, upon receipt of a write completion notification c9 corresponding to the write command w9, the synchronization processing unit 32 decrements the first counter by "1". The value of the first counter becomes "0", and the value of the second counter is "0". In this manner, due to the decrement of the first counter, the values of the first and second counters have become "0". In other words, writings by the preceding write commands w9 and w10 have been completed.

(36) Thus, the synchronization processing unit 32 issues the write command sync_w12 for synchronization processing suspended in the issuance unit 223 to the memory 23 from the issuance unit 223. Additionally, the synchronization processing unit 32 increments the first counter by "1".

Here, the operations of (35) and (36) are performed in the same cycle. Accordingly, in the cyclical checking of the first and second counters, the value of the first counter does not become "0" since decrement and increment cancel out each other.

(37) Next, the synchronization processing unit 32 receives a write completion notification c12 corresponding to the write command sync_w12 for synchronization processing. Then, the synchronization processing unit 32 decrements the first counter by "1". Thereby, it is detected that the values of the first and second counters have become both "0" in the cyclical checking. In other words, writing by the write command sync_w12 for synchronization processing has been completed.

(38) Thus, the synchronization processing unit 32 deasserts the busy signal "busy" from the subsequent control unit 324. Due to the deassertion of the busy signal "busy", the read command r13 retained on the way from the synchronization processing unit 32 to the processor 21 is received by the synchronization processing unit 32.

With the operations described above, the write command sync_w12 to the address for synchronization processing received from the processor 21 of the device 30 is reflected in the memory 23 after completion of the write commands w9 and w10 and the read command r11 received from the host device 10 or the processor 21 before the write command sync_w12. Then, it is ensured that the read command r13 from the processor 21 is issued to the memory 23 after that.

Figure 12:
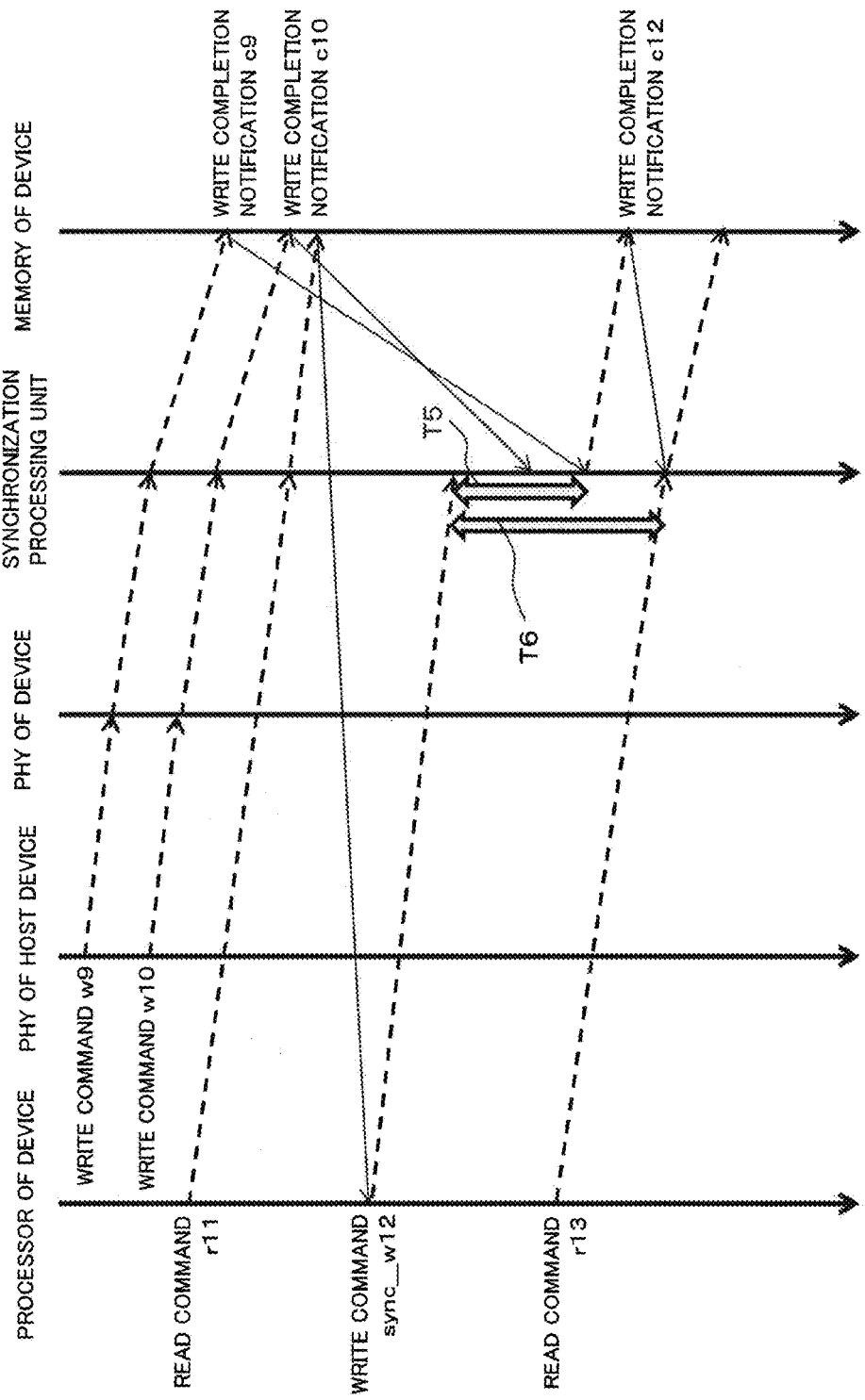
FIG. 12 is a diagram schematically illustrating the order of memory access commands that are executed in the fourth operation by the specific example of the system as the second example embodiment of the present invention.

FIG. 12 schematically depicts a state in which, with the operation, the order of issuance is ensured between the memory access commands not for synchronization processing from the host device 10 and the processor 21 of the device 30 and the memory access command for synchronization processing from the processor 21 of the device 30. Due to setting of a period T5 for suspension of the write command sync_w12 for synchronization processing, the write commands w9 and w10 from the host device 10 preceding the write command sync_w12 for synchronization processing from the processor 21 are completed before issuance of the write command sync_w12 to the memory 23. Additionally, due to setting of a period T6 for assertion of a busy signal, the read command r13 subsequent to the write command sync_w12 for synchronization processing from the processor 21 is received after completion of the write command sync_w12 for synchronization processing.

Thus, ensuring of the order of the memory access commands from the host device 10 and the processor 21 of the device 30 to the memory 23 in the device 30 is achieved by the memory access command for synchronization processing from the processor 21 of the device 30.

For example, assume a situation where, of the write commands w9 and w10 issued from the host device 10, the write command w10 writes a flag into the memory 23 by the release process of a release-consistency model. In this case, the processor 21 of the device 30 repeatedly reads the flag by the read command r11, and issues the write command sync_w12 for synchronization processing when the flag is established. Thus, it is ensured that before the write command sync_w12 for synchronization processing is received by the synchronization processing unit 32, the write commands w5 and w6 received before the read command r11 are received. Then, after the write commands w9 and w10 from the host device 10 are reflected in the memory 23, the write command sync_w12 for synchronization processing is reflected in the memory 23. In other words, it is ensured that data by the write commands w9 and w10 are written in the memory 23 before the write command sync_w12 for synchronization processing after establishment of the flag is reflected in the memory 23. Furthermore, the subsequent read command r13 is issued to the memory 23 after completion of the write command sync_w12 for synchronization processing from the processor 21 of the device 30. Accordingly, the subsequent read command r13 is suitable as a command for reading the data written by the write command w9 completed before completion of the write command sync_w12.

Thus, in the specific example 4, the write command w10 is applied as a write for writing a release-side flag by the host device 10. Additionally, the read command r11 is applied as a read for reading an acquire-side flag by the processor 21 of the device 30. In addition, the write command sync_w12 for synchronization processing is applied as a write to be executed by the processor 21 of the device 30 after establishment of the flag. Thereby, the specific example 4 indicates that the present example embodiment can actualize a release-consistency model, as described above.

In addition, in the specific example 4, the write command sync_w12 for synchronization processing issued from the processor 21 of the device 30 in (32) can be replaced by a read command sync_r12 for synchronization processing. In that case, the synchronization processing unit 32 receives read data d12 corresponding to the read command sync_r12 from the memory 23 in (37), then receives the read command r13 from the processor 21 in (38), and issues the read command r13 to the memory 23. This is an example different from the specific example 2 that actualizes the release-consistency model by issuing the read command for synchronization processing from the processor 21 of the device 30.

Additionally, in the specific example 4, the read command r13 that is received from the processor 21 of the device 30 in (38) may be a write command w13.

This is the end of the description of the specific examples.

Next, advantageous effects of the second example embodiment of the present invention will be described.

In performing synchronization processing between the plurality of processors connected by an extension bus, the system 2 as the second example embodiment of the present invention can ensure the order of memory accesses to memory for use in the synchronization processing without deteriorating performance.

The reason for that is as follows. The present example embodiment includes the following structure in addition to the same structure as that of the first example embodiment of the present invention. Specifically, on the basis of whether or not an area in the memory that is a target of a received memory access command is an area for synchronization processing, the command determination unit determines whether or not the memory access command is a command for synchronization processing. Additionally, the completion determination unit includes the counter that is incremented when a memory access command is issued, and is decremented when the completion of the memory access command is notified. Then, on the basis of the value of the counter, the completion determination unit determines whether the memory access command issued to the memory is completed or not.

With such a structure, the present example embodiment can determine at low load whether or not a memory access command issued to the device from the host device connected by the extension bus is a command for synchronization processing. Additionally, the present example embodiment can determine at low load whether a memory access command preceding a memory access command for synchronization processing is complete or not. As a result, the present example embodiment does not deteriorate performance due to the operation for ensuring the order of issuance of memory access commands to the memory in the device.

Additionally, in the present example embodiment, the description has been given of the specific example in which the extension bus is in accordance with PCIe standards. In the specific example, the memory access commands are not limited to memory reads and memory writes of PCIe and may be other PCIe transactions such as configuration reads and configuration writes. In addition, in each of the example embodiments described above, applicable extension bus standards are not limited.

Additionally, as the specific example of the present example embodiment, the description has been given of the example in which the commands preceding the read command for synchronization processing or the write command and the command subsequent thereto are the write commands. However, the types, order, and numbers of preceding and subsequent commands are not limited.

In addition, in the specific examples of the present example embodiment, the description has been given of the case in which the synchronization processing unit of the device receives the memory access commands not for synchronization processing from the host device. This is merely illustrative, and there may be a case in which the synchronization processing unit receives both memory access commands for synchronization processing and memory access commands not for synchronization processing from each of the host device and the processor of the device. Even in such a case, the present example embodiment is operated in the same manner and exhibits the same advantageous effects.

Figure 13:
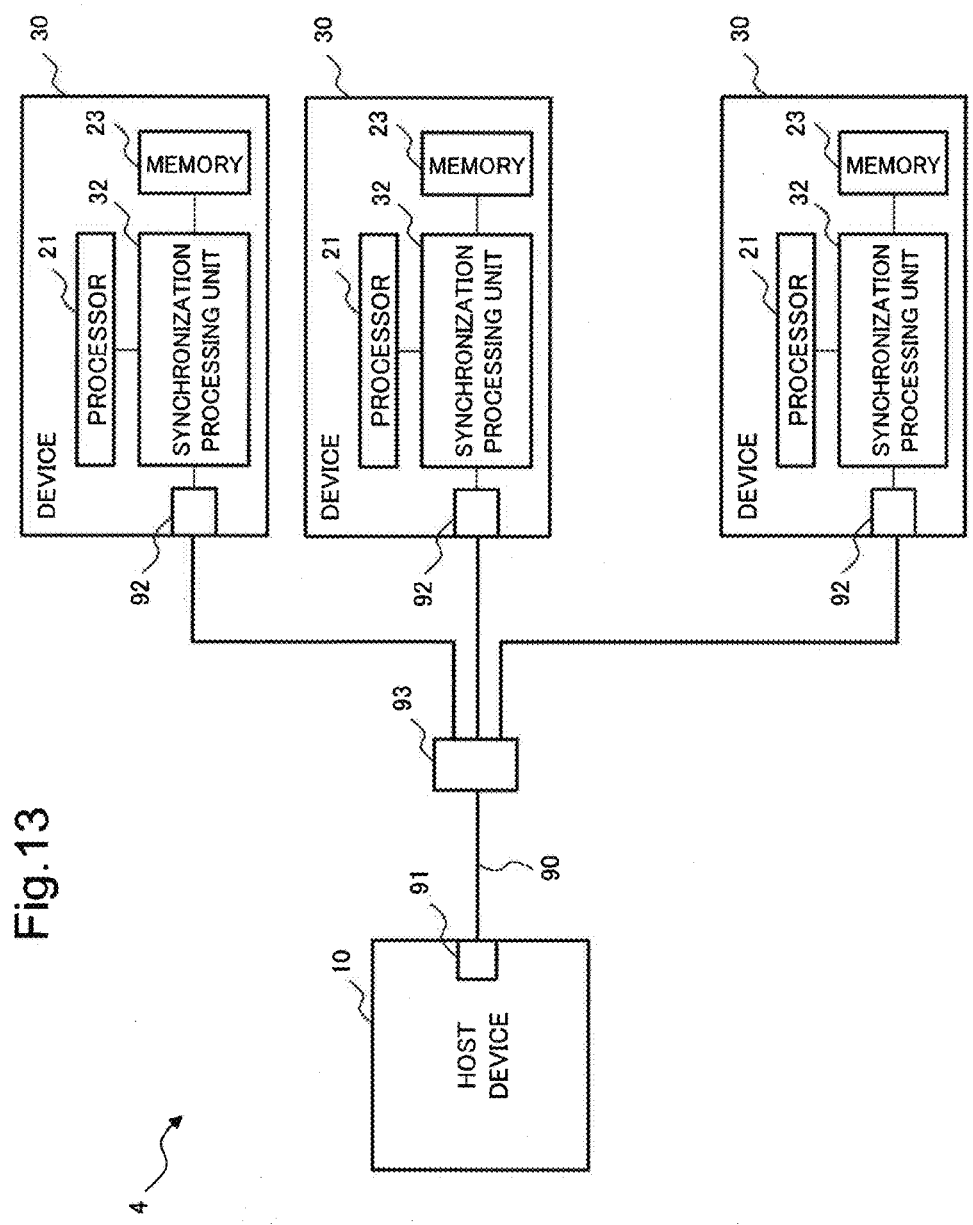
FIG. 13 is a diagram depicting the structure of another aspect of the second example embodiment of the present invention.

Next, FIG. 13 depicts another aspect of the present example embodiment of the present invention.

As depicted in FIG. 13, a system 4 as the other aspect of the present example embodiment of the present invention includes the host device 10 and a plurality of devices 30. The host device 10 and each of the devices 30 are connected by the extension bus 90 including the extension bus interfaces 91 and 92 and an extension bus switch 93.

In this case, the processor 21 of each device 30 issues a memory access command for synchronization processing to the memory 23 in the other devices 30. In the other devices 30, the synchronization processing unit 32 is operated in the same manner as in the second example embodiment of the present invention.

Thereby, between the plurality of devices 30 connected by the extension bus 90, the order of issuance of memory access commands not for synchronization processing and a memory access command for synchronization processing to the memory can be ensured without deteriorating performance. Additionally, in FIG. 13, instead of each device 30, the device 20 in the first example embodiment of the present invention may be provided.

This is the end of the description of the other aspect of the example embodiment of the present invention.

Third Example Embodiment

Figure 14:
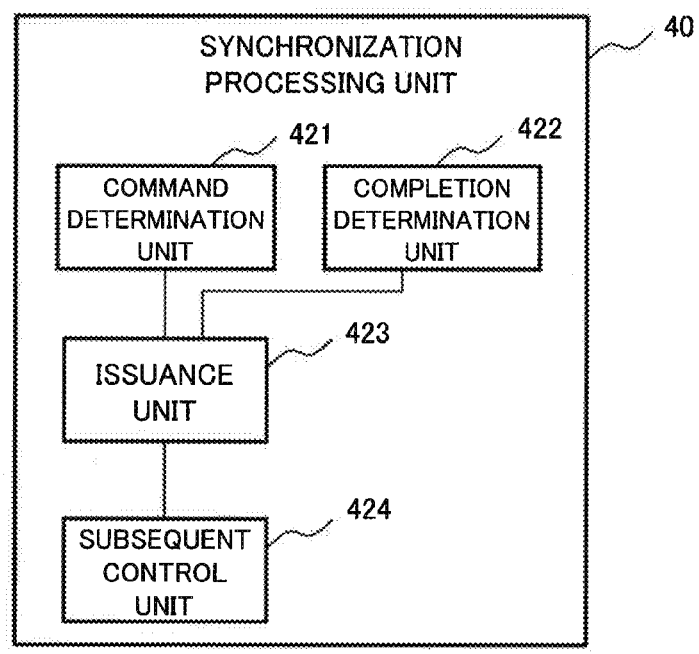
FIG. 14 is a block diagram depicting the structure of a synchronization processing unit as a third example embodiment of the present invention.
Figure 15:
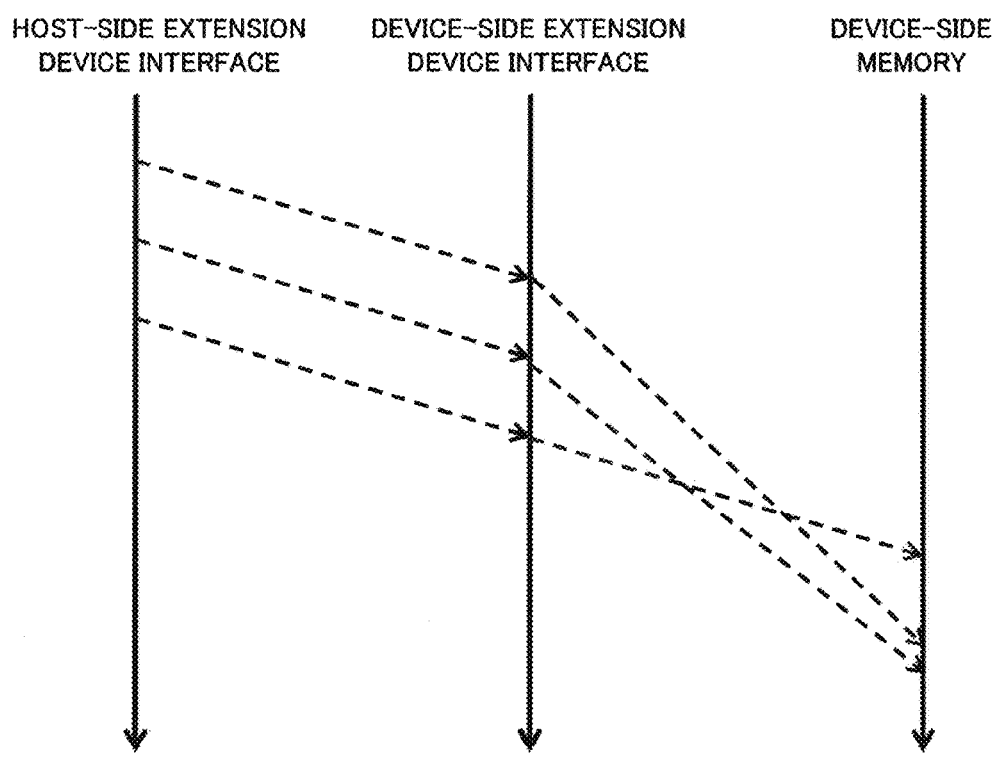
FIG. 15 is a schematic diagram illustrating the issue of a related technique.

FIG. 14 is a block diagram depicting the structure of a synchronization processing unit as a third example embodiment of the present invention.

As depicted in FIG. 14, a synchronization processing unit 40 as the other aspect of the present example embodiment of the present invention includes a command determination unit 421, a completion determination unit 422, an issuance unit 423, and a subsequent control unit 424.

The command determination unit 421 is configured to, upon receipt of a memory access command for accessing memory in a device including the synchronization processing unit from an external device connected to the device by an extension bus or from a processor in the device, determine whether or not the memory access command is a command for synchronization processing for instructing synchronization processing.

The completion determination unit 422 is configured to determine whether a memory access command issued to the memory is complete or not.

The issuance unit 423 is configured to issue a memory access command determined not to be for the synchronization processing to the memory, and that suspends issuance of a memory access command determined to be for the synchronization processing until completion of a preceding memory access command received before the memory access command for the synchronization processing is determined by the completion determination unit and then issues the suspended memory access command.

The subsequent control unit 424 is configured to, during a period from the suspension of the memory access command for the synchronization processing to the issuance and then completion thereof, perform control so that a subsequent memory access command is not received from the external device and the processor in the device.

With such a structure, the technique that, when performing synchronization processing between a plurality of processors connected by an extension bus, ensures the order of memory accesses to memory for use in the synchronization processing without deteriorating performance can be provided.

Additionally, in the above-described respective example embodiments, the memory in the device can be RAM, a resister, or any of various other kinds of storage media.

In addition, the above-described respective example embodiments can be implemented in combination as appropriate.

Additionally, the present invention is not limited to the above-described respective example embodiments and can be implemented in various manners.

The previous description of embodiments is provided to enable a person skilled in the art to make and use the present invention. Moreover, various modifications to these exemplary embodiments will be readily apparent to those skilled in the art, and the generic principles and specific examples defined herein may be applied to other embodiments without the use of inventive faculty. Therefore, the present invention is not intended to be limited to the exemplary embodiments described herein but is to be accorded the widest scope as defined by the limitations of the claims and equivalents. Further, it is noted that the inventor's intent is to retain all equivalents of the claimed invention even if the claims are amended during prosecution.

The whole or part of the example embodiments disclosed above can be described as, but not limited to, the following supplementary notes.

[Supplementary Note 1]

A synchronization processing unit including:

a command determination unit configured to, upon receipt of a memory access command for accessing memory in a device including the synchronization processing unit from an external device connected to the device by an extension bus or from a processor in the device, determine whether or not the memory access command is a command for synchronization processing for instructing synchronization processing;

a completion determination unit configured to determine whether a memory access command issued to the memory is complete or not;

an issuance unit configured to issue a memory access command determined not to be for the synchronization processing to the memory, and that suspends issuance of a memory access command determined to be for the synchronization processing until completion of a preceding memory access command received before the memory access command for the synchronization processing is determined by the completion determination unit and then issues the suspended memory access command; and a subsequent control unit configured to, during a period from the suspension of the memory access command for the synchronization processing to the issuance and then completion thereof, perform control so that a subsequent memory access command is not received from the external device and the processor in the device.

[Supplementary Note 2]

The synchronization processing unit according to claim 1, wherein the command determination unit stores information that represents an area for the synchronization processing in the memory, and, based on whether or not an area in the memory that is a target of the received memory access command is included in the area for the synchronization processing, determines whether or not the memory access command is a command for the synchronization processing.

[Supplementary Note 3]

The synchronization processing unit according to claim 1 or 2, wherein the completion determination unit includes a counter that is incremented when the memory access command is issued to the memory and that is decremented when completion of the memory access command is notified, and, based on a value of the counter, determines whether the memory access command issued to the memory is complete or not.

[Supplementary Note 4]

A device including:
the synchronization processing unit according to any one of SUPPLEMENTARY NOTES 1 to 3;
the memory; and
the processor.

[Supplementary Note 5]

A system including:
the device according to SUPPLEMENTARY NOTE 4; and
a host device as the external device.

[Supplementary Note 6]

The system according to SUPPLEMENTARY NOTE 5, further including, as the external device, an other device connected by the extension bus.

[Supplementary Note 7]

A method including:
when a synchronization processing unit receives a memory access command for accessing memory in a device including the synchronization processing unit from an external device connected to the device by an extension bus or from a processor in the device, determining whether or not the memory access command is a command for synchronization processing for instructing synchronization processing;
issuing a memory access command determined not to be for the synchronization processing to the memory;
suspending issuance of a memory access command determined to be for the synchronization processing until completion of a preceding memory access command received before the memory access command for the synchronization processing is determined and then issuing the suspended memory access command; and
during a period from the suspension of the memory access command for the synchronization processing to the issuance and then completion thereof, performing control so that a subsequent memory access command is not received from the external device and the processor in the device.

REFERENCE SIGNS LIST 1, 2, 4: System
10: Host device
11: CPU
13: Memory
20, 30: Device
21: Processor
22, 32: Synchronization processing unit
23: Memory
221, 321: Command determination unit
222, 322: Completion determination unit
223: Issuance unit
224, 324: Subsequent control unit
326: Storage area
327: Counter
90: Extension bus
91, 92: Extension bus interface
93: Extension bus switch
901: Root complex
902, 903: PHY
904: DLL
905: TL
906: Link

What is claimed is:

1. A device comprising:
a synchronization processing unit including:
a command determination unit configured to, upon receipt of a memory access command for accessing memory in a device including the synchronization processing unit from an external device connected to the device by an extension bus or from a processor in the device, determine whether or not the memory access command is a command for synchronization processing for instructing synchronization processing;
a completion determination unit configured to determine whether a memory access command issued to the memory is complete or not;
an issuance unit configured to issue a memory access command determined not to be for the synchronization processing to the memory, and that suspends issuance of a memory access command determined to be for the synchronization processing until completion of a preceding memory access command received before the memory access command for the synchronization processing is determined by the completion determination unit and then issues the suspended memory access command; and
a subsequent control unit configured to, during a period from the suspension of the memory access command for the synchronization processing to the issuance and then completion thereof, perform control so that a subsequent memory access command is not received from the external device and the processor in the device; and
the memory; and
the processor.

2. The device according to claim 1, wherein
the command determination unit stores information that represents an area for the synchronization processing in the memory, and, based on whether or not an area in the memory that is a target of the received memory access command is included in the area for the synchronization processing, determines whether or not the memory access command is a command for the synchronization processing.

3. The device according to claim 2, wherein the completion determination unit includes a counter that is incremented when the memory access command is issued to the memory and that is decremented when completion of the memory access command is notified, and, based on a value of the counter, determines whether the memory access command issued to the memory is complete or not.

4. The device according to claim 1, wherein the completion determination unit includes a counter that is incremented when the memory access command is issued to the memory and that is decremented when completion of the memory access command is notified, and, based on a value of the counter, determines whether the memory access command issued to the memory is complete or not.

5. A system comprising:
a device including:
   a synchronization processing unit including:
      a command determination unit configured to, upon receipt of a memory access command for accessing memory in a device including the synchronization processing unit from an external device connected to the device by an extension bus or from a processor in the device, determine whether or not the memory access command is a command for synchronization processing for instructing synchronization processing;
      a completion determination unit configured to determine whether a memory access command issued to the memory is complete or not;
      an issuance unit configured to issue a memory access command determined not to be for the synchronization processing to the memory, and that suspends issuance of a memory access command determined to be for the synchronization processing until completion of a preceding memory access command received before the memory access command for the synchronization processing is determined by the completion determination unit and then issues the suspended memory access command; and
      a subsequent control unit configured to, during a period from the suspension of the memory access command for the synchronization processing to the issuance and then completion thereof, perform control so that a subsequent memory access command is not received from the external device and the processor in the device;
   the memory; and
   the processor; and
a host device as the external device.

6. The system according to claim 5, wherein
the command determination unit stores information that represents an area for the synchronization processing in the memory, and, based on whether or not an area in the memory that is a target of the received memory access command is included in the area for the synchronization processing, determines whether or not the memory access command is a command for the synchronization processing.

7. The system according to claim 6, wherein the completion determination unit includes a counter that is incremented when the memory access command is issued to the memory and that is decremented when completion of the memory access command is notified, and, based on a value of the counter, determines whether the memory access command issued to the memory is complete or not.

8. The system according to claim 5, wherein the completion determination unit includes a counter that is incremented when the memory access command is issued to the memory and that is decremented when completion of the memory access command is notified, and, based on a value of the counter, determines whether the memory access command issued to the memory is complete or not.

9. The system according to claim 5, further comprising, as the external device, an other device connected by the extension bus.

* * * * *